(12) United States Patent
Weng

(10) Patent No.: US 12,143,139 B2
(45) Date of Patent: *Nov. 12, 2024

(54) PROTECTIVE CASE FOR FOLDING SCREEN PHONE

(71) Applicant: SHENZHEN GUANGYIPENG TECHNOLOGY CO., LTD., Guangdong (CN)

(72) Inventor: Jie Weng, Guangdong (CN)

(73) Assignee: SHENZHEN GUANGTIPENG TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,501

(22) Filed: Jan. 17, 2023

(65) Prior Publication Data
US 2024/0048169 A1 Feb. 8, 2024

Related U.S. Application Data

(63) Continuation of application No. 17/878,920, filed on Aug. 2, 2022, now Pat. No. 11,632,141.

(51) Int. Cl.
*H04B 1/3888* (2015.01)
(52) U.S. Cl.
CPC ................... *H04B 1/3888* (2013.01)

(58) Field of Classification Search
CPC .. H04B 1/3888; A45C 11/00; A45C 2011/002
See application file for complete search history.

(56) References Cited

U.S. PATENT DOCUMENTS

| | | | | |
|---|---|---|---|---|
| 2008/0123286 | A1* | 5/2008 | Watanabe | G06F 1/1635 361/679.27 |
| 2016/0186474 | A1* | 6/2016 | Tong | G06F 1/1616 16/250 |
| 2017/0187409 | A1* | 6/2017 | Widiaman | G06F 1/1626 |
| 2017/0346523 | A1* | 11/2017 | Nyholm | A45C 11/00 |
| 2018/0062686 | A1* | 3/2018 | Lucente | A45C 13/02 |
| 2020/0412401 | A1* | 12/2020 | Kim | H04M 1/185 |

* cited by examiner

*Primary Examiner* — Yuwen Pan
*Assistant Examiner* — Fatuma G Sherif

(57) ABSTRACT

A protective case for folding screen phone includes a first case body, a second case body and a side stylus holder. The side stylus holder includes parallel first and seconds sides. The first side is rotatably connected to the second case body, making the second side of the side stylus holder be capable of rotating between a first position away from the first case body and a second position close to the first case body. A first groove is defined in the side stylus holder for detachably accommodating a stylus therein, and the stylus accommodated in the first groove rotates along with the side stylus holder.

19 Claims, 24 Drawing Sheets

PROTECTIVE CASE FOR FOLDING SCREEN PHONE

CROSS-REFERENCE TO RELATED APPLICATIONS

This application is a continuation application of application Ser. No. 17/878,920, filed on Aug. 2, 2022, which claims priority to Chinese Patent Application No. 202220985302.9 filed on Apr. 26, 2022. The content of the aforementioned application, including any intervening amendments thereto, are incorporated herein by reference.

TECHNICAL FIELD

The present disclosure belongs to the technical field of accessories for mobile phones, and more particularly to a protective case for folding screen phone.

BACKGROUND

Nowadays, with the technological development of smart mobile phones, the display size options for smart mobile phones are increasing. As a result, the size of smart mobile phones is making it inconvenient to carry. Folding screen phones as an emerging product are widely loved by consumers. A foldable screen includes a first part and a second part which are hinged. The first part has a first screen, and the second part has a second screen. When in use, the first part and the second part may be opened, for example, at 180 degrees, and at this time, the first screen and the second screen are engaged to form the screen of the phone. When not in use, the user may rotate the first part and the second part to make the first part and the second part overlap. As such, the size of the phone may be effectively reduced, which brings the convenience to carry.

However, the case for the mobile phone in the prior art is not suitable for a folding screen phone. Accordingly, it is necessary to provide a protective case for folding screen phone.

SUMMARY

An object of an embodiment of the present disclosure is to provide a protective case for folding screen phone.

In order to achieve the above purpose, the technical solution adopted in the present disclosure is to provide a protective case for folding screen phone. The folding screen phone includes a first part with a first screen and a second part with a second screen, wherein the first part and the second part are rotatably connected through a hinge. The protective case for folding screen phone includes:
  a first case body, configured for accommodating the first part of the folding screen phone;
  a second case body, configured for accommodating the second part of the folding screen phone; and
  a side stylus holder comprising parallel first and second sides, the first side being rotatably connected to the second case body, making the second side of the side stylus holder be capable of rotating between a first position away from the first case body and a second position close to the first case body; a first groove being defined in the side stylus holder for detachably accommodating a stylus therein, the stylus accommodated in the first groove rotate along with the side stylus holder.

Compared with the prior art, the protective case for folding screen phone provided by the embodiment of the present disclosure has the advantages: one side of the second case body is rotatably connected to the side stylus holder, which may be folded or unfolded. Meanwhile, the stylus may be placed in the first groove of the side stylus holder, such that both the stylus and folding screen phone are stored in the protective case for folding screen phone, which reduces a space occupied by the protective case for folding screen phone, which is convenient to carry and use, and may effectively prevent loss of the stylus. The unfolded side stylus holder may form a holding portion for the user to hold after the folding screen phone is unfolded, such that the user can conveniently watch or operate the screen, thereby effectively reducing the holding difficulty.

BRIEF DESCRIPTION OF THE DRAWINGS

In order to illustrate technical solutions of the present disclosure more clearly, accompanying drawings required to be used in describing the embodiments or the prior art will be briefly introduced below. Obviously, the accompanying drawings in the following description are only some embodiments of the present disclosure. For those ordinarily skilled in the art, other accompanying drawings may be obtained based on these accompanying drawings without any creative labor.

DESCRIPTION OF THE EMBODIMENTS

Figure 1:
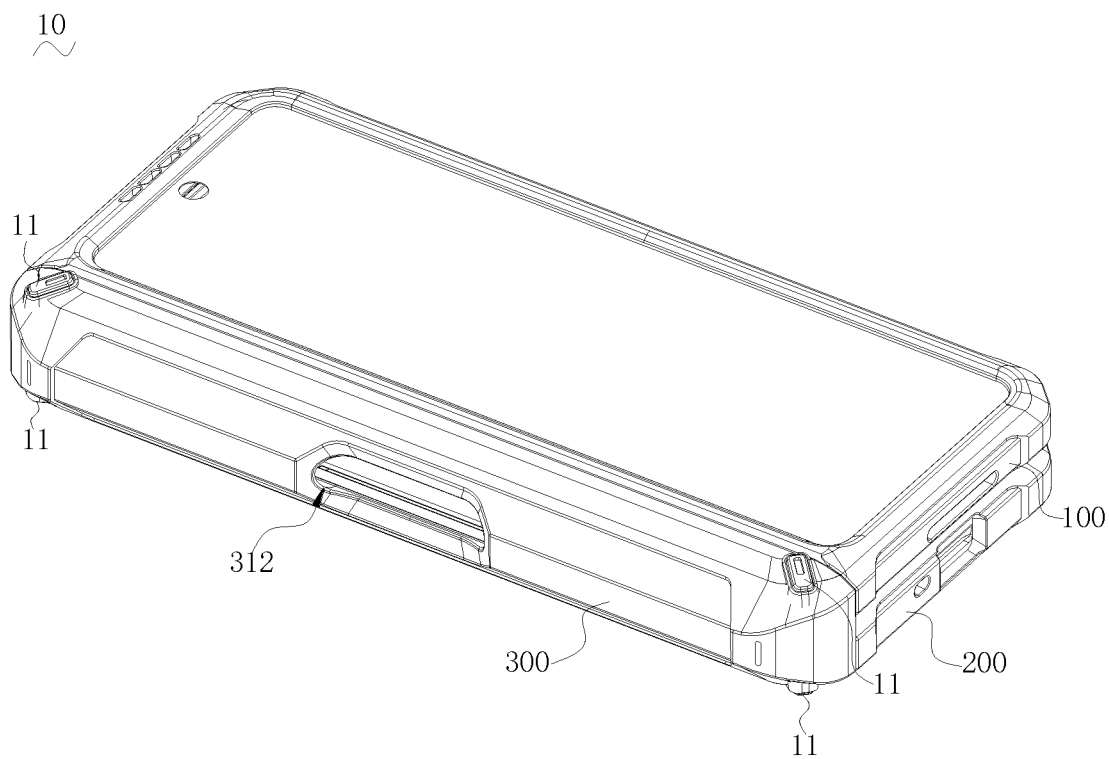
FIG. 1 is a perspective view of a protective case for folding screen phone provided by an embodiment of the present disclosure, wherein a side stylus holder is in a folded state.

In order to make technical problems, technical solutions and beneficial effects to be solved by the present disclosure clearer, the present disclosure will be further described in detail below with reference to accompanying drawings and embodiments. It should be understood that specific embodiments described herein are only intended to explain the present disclosure, not to limit the present disclosure.

It should be noted that when an element is referred to as being "fixed to" or "disposed on" another element, it may be directly or indirectly on the other element. When an element is referred to as being "connected to" another element, it may be directly or indirectly connected to the other element.

It should be understood that oriental or positional relationships indicated by terms "length", "width", "upper", "lower", "front", "rear", "left", "right", "vertical", "horizontal", "top", "bottom", "inner", "outer" and the like are only intended to facilitate the description of the present disclosure and simplify the description based on oriental or positional relationships shown in the accompanying drawings, not to indicate or imply that the apparatus or element referred must have a specific orientation, is constructed and operated in a specific orientation, and therefore cannot be understood as a limitation of the present disclosure.

In addition, terms "first" and "second" are only used for descriptive purposes, and cannot be understood as indicating or implying relative importance or implicitly indicating the number of technical features indicated. Therefore, features defined with "first" and "second" may explicitly or implicitly include one or more of these features. In the description of the present disclosure, "a plurality of" refers to two or more than two, unless otherwise particularly defined.

With reference to FIG. 1 to FIG. 4 together, a protective case for folding screen phone 10 according to an embodiment of the present disclosure will be described. The protective case for folding screen phone 10 includes a first case body 100, a second case body 200 and a side stylus holder 300. The first case body 100, the second case body 200 and the side stylus holder 300 may all be injection molded parts.

The first case body 100 is configured for accommodating a first part 21 of a folding screen phone 20. The first case body 100 includes a bottom wall and a side wall, wherein the side wall extends from a periphery of the bottom wall, and cooperatively define an accommodating cavity for accommodating the first part 21 of the folding screen phone 20 with the bottom wall. The side wall of the first case body 100 is non-closed in a circumferential direction, and extends along the circumferential direction with a substantially U shape, that is, the first case body 100 are opened at a bottom and a left side thereof, respectively, and the opening in the left side forms a first inlet 101 for the insertion of the first part 21.

The second case body 200 is configured for accommodating a second part 22 of the folding screen phone 20. The second case body 200 includes a bottom wall and a side wall, wherein the side wall extends from a periphery of the bottom wall, and cooperatively define an accommodating cavity for accommodating the second part 22 of the folding screen phone 20 with the bottom wall. The side wall of the second case body 200 is non-closed in a circumferential direction, and extends along the circumferential direction with a substantially U shape, that is, the second case body 200 are opened at a top and a left side thereof, respectively, and the opening in the left side forms a second inlet 201 for the insertion of the second part 22. The side wall of the second case body 200 is provided with a key operating portion, a sound transmitting hole and a data cable plug through hole, and the bottom wall of the second case body 200 is provided with a camera hole for exposing a camera of the folding screen phone 20.

The side stylus holder 300 has parallel first side 301 and second side 302. The side stylus holder 300 has a substantially U-shaped cross section, and corners of an outer surface thereof may be set with smooth transition. The first side 301 of the side stylus holder 300 is rotatably connected to the second case body 200, and particularly the first side 301 may be rotatably connected to the second case body 200 through a rotating shaft mechanism or a rotating shaft. The second side 302 of the side stylus holder 300 is detachably connected to the first case body 100. The side stylus holder 300 is rotatable relative to the second case body 200, such that the second side 302 of the side stylus holder 300 is movable between a first position away from the first case body 100 and a second position close to the first case body 100. That is, the side stylus holder 300 can be opened or closed. When the side stylus holder 300 is opened, the second side 302 of the side stylus holder 300 moves to the first position which is away from the first case body 100. When the side stylus holder 300 is closed, the second side 302 of the side stylus holder 300 moves to the second position which is close to the first case body 100. At this time, the side stylus holder 300 is capable of covering a hinge 23 of the folding screen phone 20. In this way, the hinge 23 may be effectively protected, and the service life of the folding screen phone 20 is prolonged.

It should be understood that the side stylus holder 300 may be coated with one or more layers of shockproof materials, or the side stylus holder 300 may be made in one piece by hard glue and shockproof materials, so as to further enhance the strength of the side stylus holder 300, and thus enhance the protection performance.

Preferably, the second side 302 of the side stylus holder 300 may be connected to the first case body 100 by means of magnetic attraction. As such, when the side stylus holder 300 closes, the second side 302 of the side stylus holder 300 is attracted to the first case body 100, which can prevent affecting the protection of the folding screen phone 20 for closed loosely or opened at will of the side stylus holder 300. In addition, compared with other connecting means, magnetic connection may omit the step of manually opening the side stylus holder 300 in the process of unfolding the folding screen phone 20. During unfolding the first screen and the second screen of the folding screen phone 20, the first case body 100 may push against the side stylus holder 300 to prevent the side stylus holder 300 from interfering with unfolding the screen of the folding screen phone 20.

Preferably, in this embodiment, magnetic members capable of attracting each other are embedded in corresponding positions of opposite side walls of the second side 302 of the side stylus holder 300 and the first case body 100. For example, a magnet block 340 may be embedded in one of side surfaces of the second side 302 of the side stylus holder 300 and the left side of the first case body 100, and a stainless steel block 120 may be embedded in the other of side surfaces of the second side 302 of the side stylus holder 300 and the left side of the first case body 100, thereby obtaining magnetic connection between the side stylus holder 300 and the first case body 100. Particularly, as shown in FIG. 3, two magnet blocks 340 are embedded in the side surface of the second side 302 of the side stylus holder 300 at intervals, and two stainless steel blocks 120 are embedded in the side surface of the left side of the first case body 100, thereby obtaining magnetic connection between the side stylus holder 300 and the first case body 100.

It should be understood that two magnet blocks may be disposed on the side surfaces of the second side 302 of the side stylus holder 300 and the left side of the first case body 100 respectively, and the two magnet blocks of the side stylus holder 300 and the first case body 100 have opposite polarities and attract each other. In this way, the side stylus holder 300 may also be connected to the first case body 100 by means of magnetic attraction. None magnetic members capable of attracting each other may be disposed in the first case body 100 and side stylus holder 300 when the side stylus holder 300 is rotatably connected to the second case body 200 through the rotating shaft mechanism, the rotating shaft mechanism may provide a driving force for rotating the side stylus holder 300 in a closing direction. As a result, the side stylus holder 300 may be prevented from being closed loosely or opened at will by the driving force provided by the rotating shaft mechanism.

Figure 2:
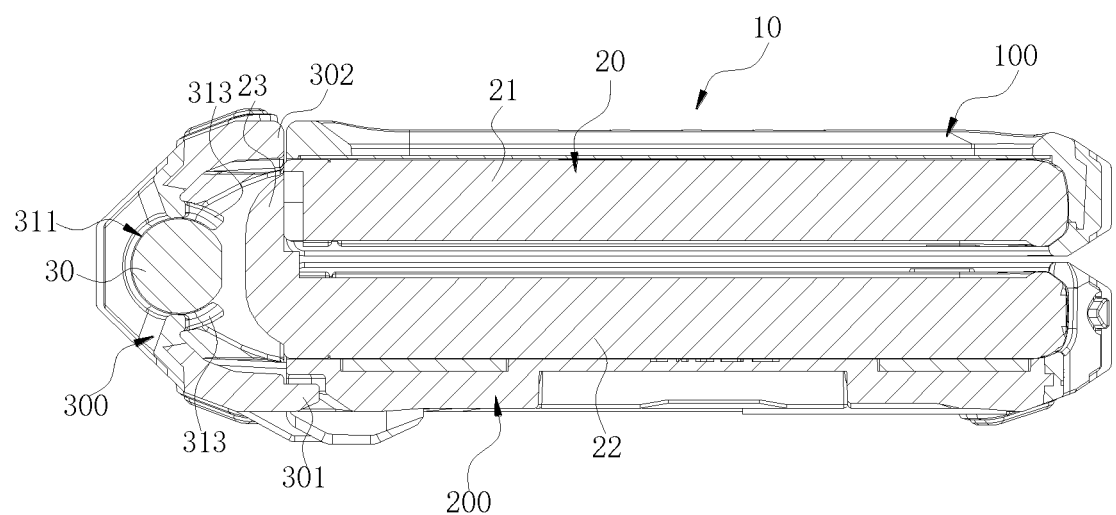
FIG. 2 is a cross-sectional view of the protective case for folding screen phone shown in FIG. 1, with the folding screen phone and a stylus.
Figure 3:
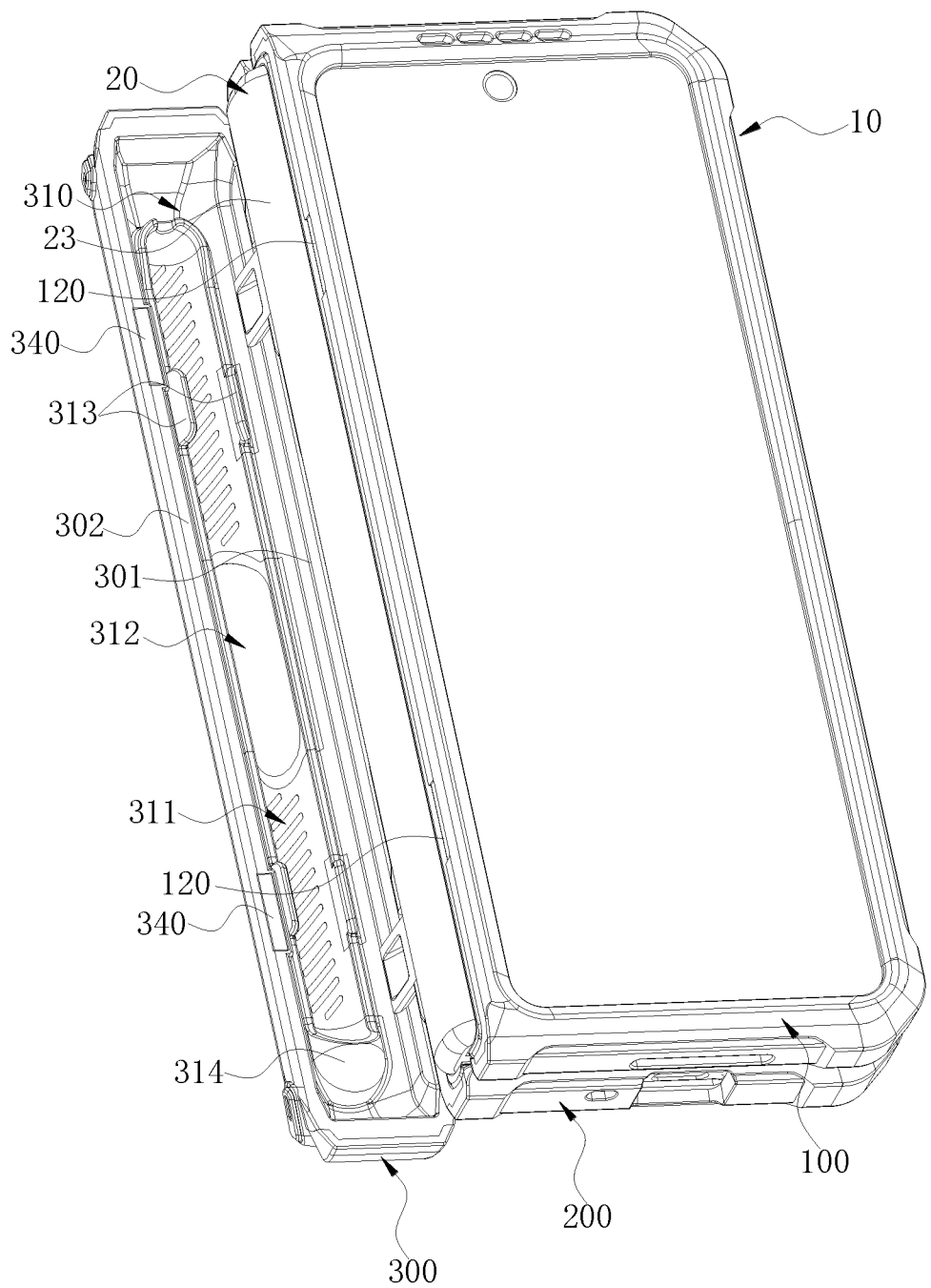
FIG. 3 is a perspective view of the protective case for folding screen phone shown in FIG. 1 with the folding screen phone, wherein the side stylus holder is in an unfolded state.
Figure 4:
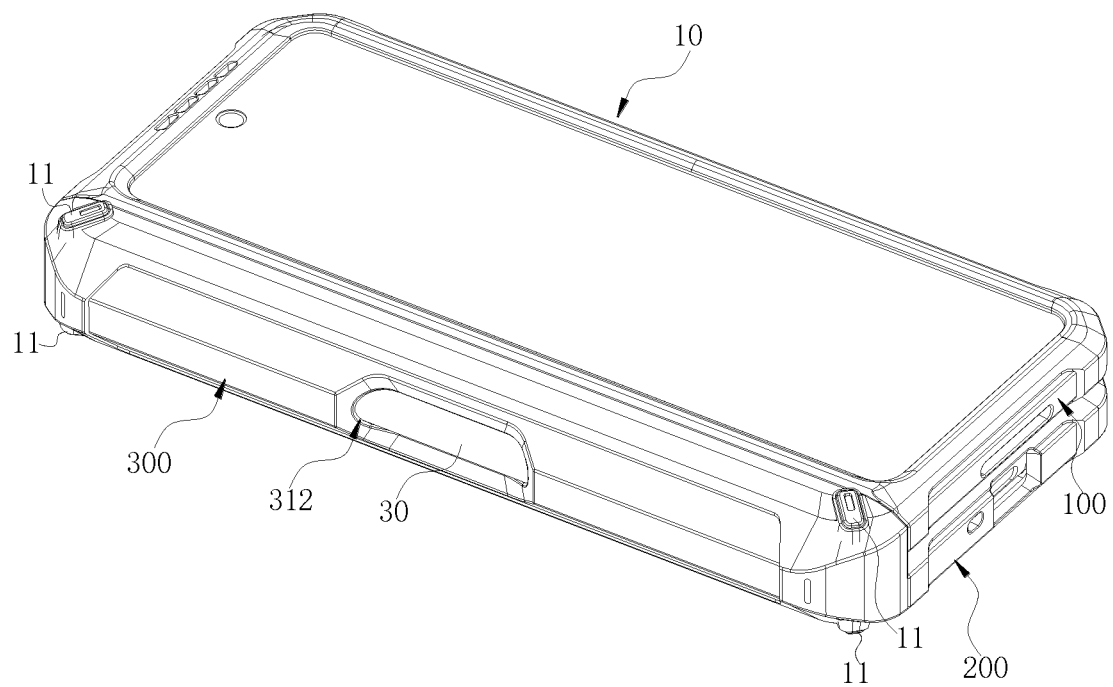
FIG. 4 is a perspective view of the protective case for folding screen phone shown in FIG. 2.
Figure 5:
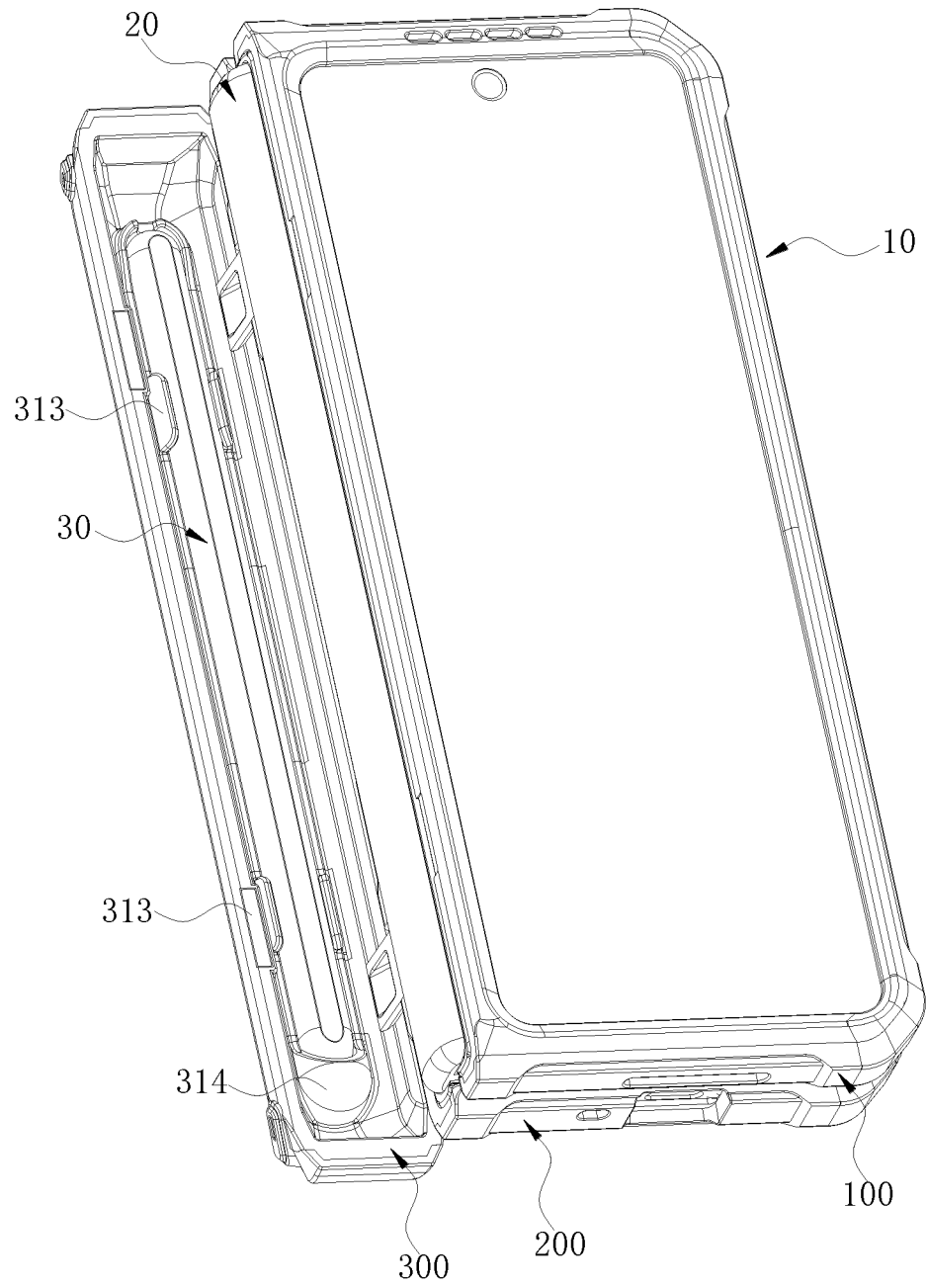
FIG. 5 is a perspective view of the protective case for folding screen phone shown in FIG. 2, wherein the side stylus holder is in an unfolded state.

With reference to FIG. 2, FIG. 3 and FIG. 5 together, an inner surface of the side stylus holder 300 encloses an accommodating cavity 310 capable of accommodating a stylus 30 of the folding screen phone 20. The stylus 30 may be received in the accommodating cavity 310 of the side stylus holder 300 when not in use, such that both the stylus 30 and folding screen phone 20 are received in the protective case for folding screen phone 10, which facilitates carry and use, and prevents loss of the stylus 30. Meanwhile, the stylus 30 is accommodated in the side stylus holder 300, which may reduce a space occupied by the folding screen phone 20. Compared with a structure accommodating the stylus 30 in an outer surface of the protective case, the protective case for folding screen phone 10 in this embodiment is relatively flat and beautiful in overall appearance.

Figure 6:
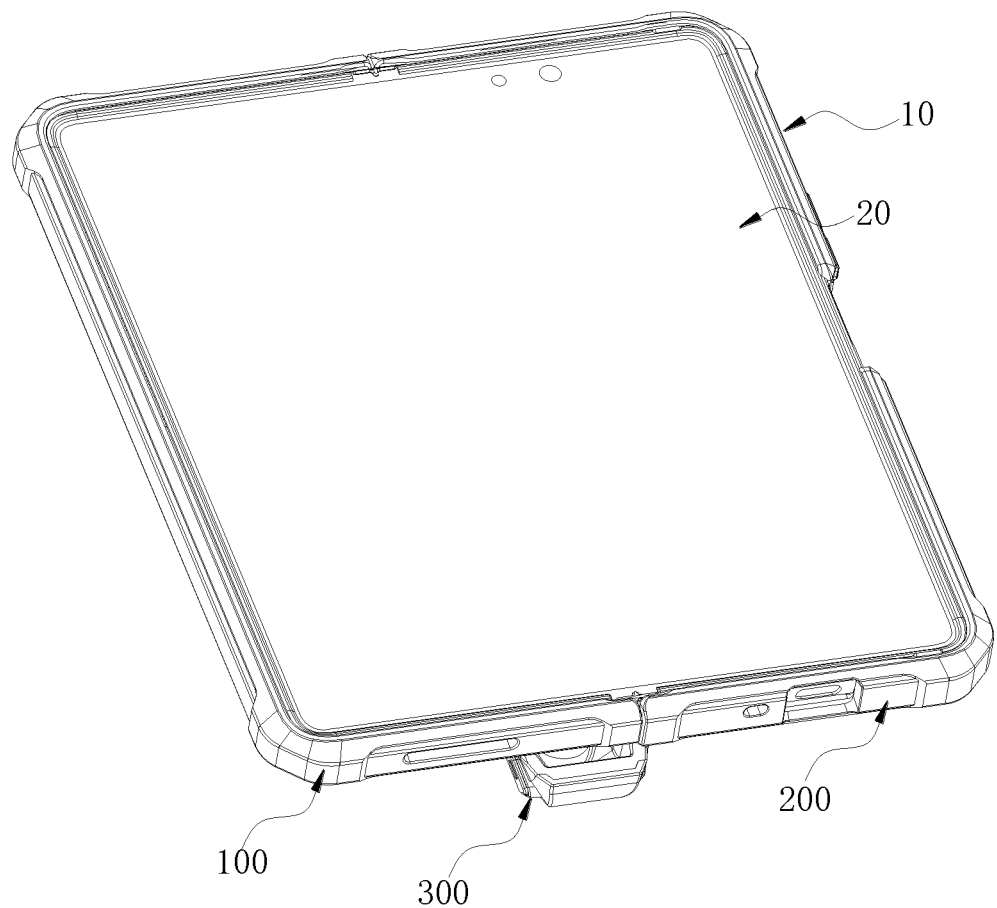
FIG. 6 is a perspective view of the protective case for folding screen phone shown in FIG. 2, wherein the folding screen phone is in an unfolded state.
Figure 7:
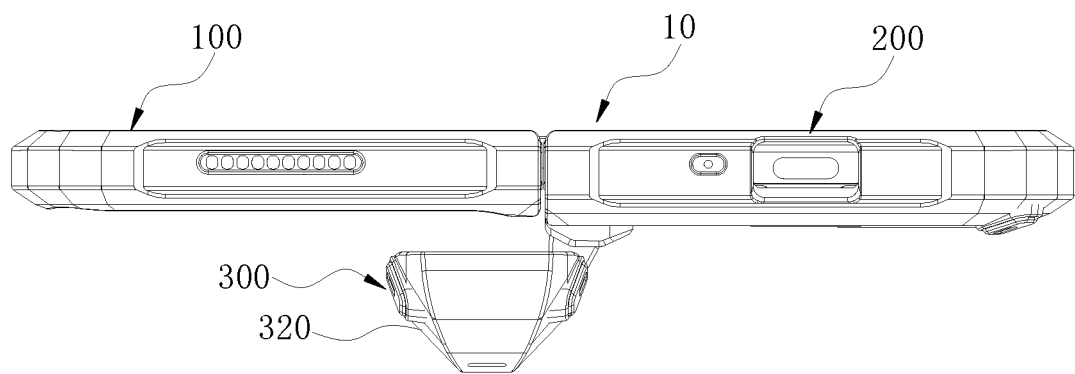
FIG. 7 is a side view of the protective case for folding screen phone shown in FIG. 6.

With reference to FIG. 6 and FIG. 7 together, the side stylus holder 300 may act as a holding portion 320 which is convenient to hold when the folding screen phone 20 is unfolded. When the folding screen phone 20 is unfolded, the side stylus holder 300 is also in an unfolded state. At this time, the user may hold the side stylus holder 300 at the bottom by one hand, facilitating watch or operate the screen by the other hand of the user. Since the folding screen phone 20 has a larger size after unfolded, and has a large overall weight, if the side stylus holder 300 of this embodiment is not provided, one side of the folding screen phone 20 is held by one hand while the other side the folding screen phone 20 is suspended during in use, the user is laborious, and the stability is poor when the user operates the screen, the folding screen phone 20 is easy to shake, or even falls. The side stylus holder 300 of this embodiment may form a holding portion 320, such that the user may control the folding screen phone 20 more stably by holding the side stylus holder 300, reducing the holding strength and the use difficulty.

Compared with the prior art, the protective case for folding screen phone 10 provided by the present disclosure has the advantages: one side of the second case body is rotatably connected with the side stylus holder, which may be folded or unfolded, and the hinge 23 may be covered when the side stylus holder 300 is folded, thereby forming better protection to the hinge 23 of the folding screen phone 20, preventing damage to the hinge 23 when the folding screen phone 20 falls, and prolonging the service life of the folding screen phone 20 effectively. Meanwhile, the stylus 30 may be placed in the side stylus holder, such that both the stylus 30 and folding screen phone 20 are accommodated in the protective case for folding screen phone 10, which reduces a space occupied by the protective case for folding screen phone 10, which is convenient to carry and use, and may effectively prevent loss of the stylus. The side stylus holder 300 acts as the holding portion 320 for the user to hold after the folding screen phone 20 is unfolded, such that the user can conveniently watch or operate the screen, thereby effectively reducing the holding difficulty.

With reference to FIG. 3, FIG. 4, FIG. 8 and FIG. 9 together, in details, the side stylus holder 300 is provided with a first groove 311 within the accommodating cavity 310 for accommodating the stylus 30. When the side stylus holder 300 closes, a space is defined between the stylus 30 and the hinge 23. When the side stylus holder 300 opens, the stylus 30 may be taken out of the first groove 311.

A side wall of the side stylus holder 300 is provided with a first through hole 312 which is communicated with the first groove 311. The first through hole 312 exposes the stylus 30 to the second case body 200 and facilitates the finger to stir the stylus 30. That is, the user may insert a finger into the side stylus holder 300 through the first through hole 312, so as to stir the stylus 30 in the first groove 311, such that the stylus 30 is loosened from the first groove 311 or disengaged from the first groove 311 completely. The side stylus holder 300 is provided with the first through hole 312, facilitating the operation of taking the stylus 30 out of the side stylus holder 300 and reducing the difficulty of taking out the stylus 30.

Particularly, in this embodiment, the first through hole 312 is a strip-shaped hole, and an extending direction of the length of the strip-shaped hole is parallel to a length direction of the first groove 311. The specific width of the first through hole 312 may be set to facilitate inserting a portion of a finger into the first groove 311 without creating a gap between the stylus 30 and the groove wall of the first groove 311, thereby reducing the entry of dust or foreign matters into the side stylus holder 300. The length of the first through hole 312 is less than that of the first groove 311, and particularly, the length of the first through hole 312 may be less than half of the length of the first groove 311.

The side stylus holder 300 is provided with elastic locking protrusions 313 on two opposite sides of the first groove 311, and the elastic locking protrusions 313 on two sides elastically clamp and fix the stylus 30 in the first groove 311. That is, the elastic clamping protrusions 313 on two sides form an elastic clamping structure, and the elastic clamping structure may stably clamp the stylus 30 in the first groove 311. The setting of elastic locking protrusions 313 enable the stylus 30 to be clamped more stably in the first groove 311. When the stylus 30 is idle, the stylus 30 will not disengage from the first groove 311 even if vibration or shaking occurs. In this embodiment, the side stylus holder 300 is provided with two sets of elastic locking protrusions 313 on two opposite sides of the first groove 311, wherein one set of elastic locking protrusions 313 is disposed at positions close to the front end of the first groove 311, and the other set of elastic locking protrusions 313 is disposed at positions close to the rear end of the first groove 311.

Figure 10:
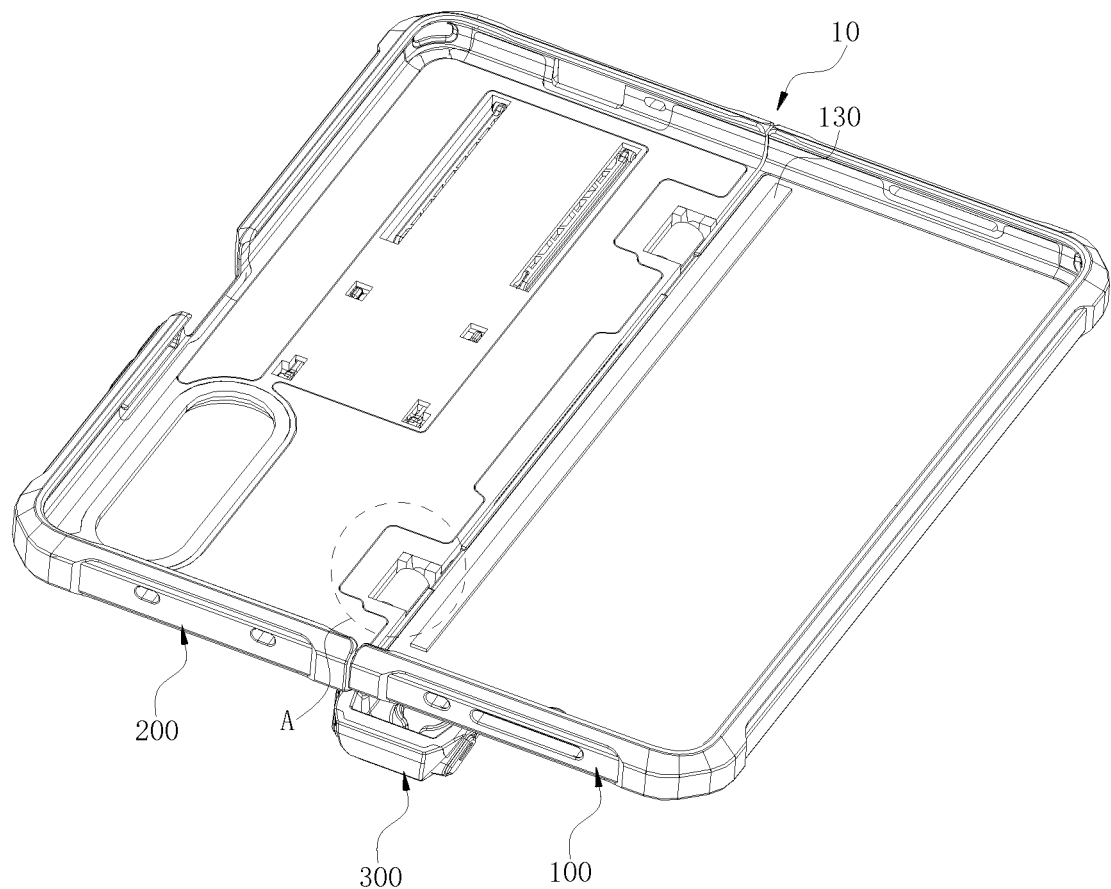
FIG. 10 is a perspective view of the protective case for folding screen phone shown in FIG. 1 after unfolded.
Figure 11:
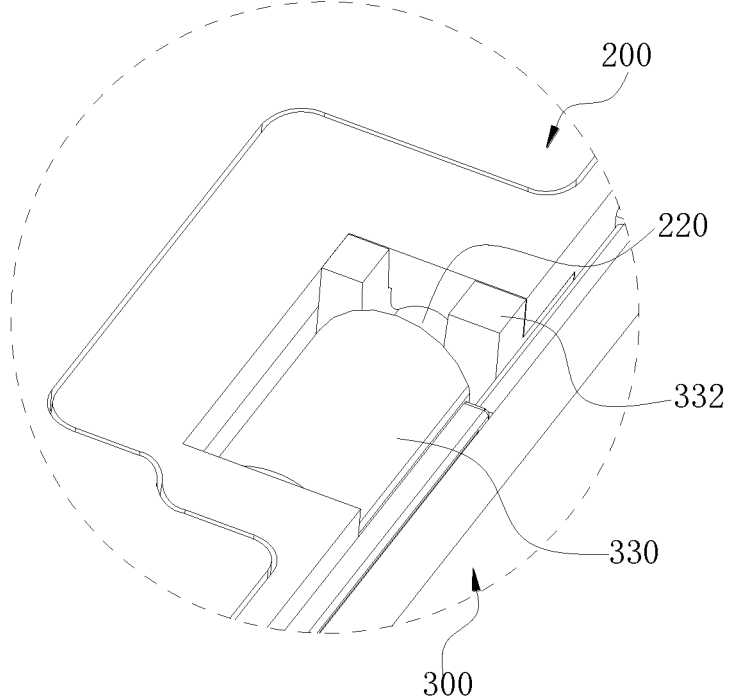
FIG. 11 is an enlarged, schematic view of a portion A in FIG. 10.
Figure 12:
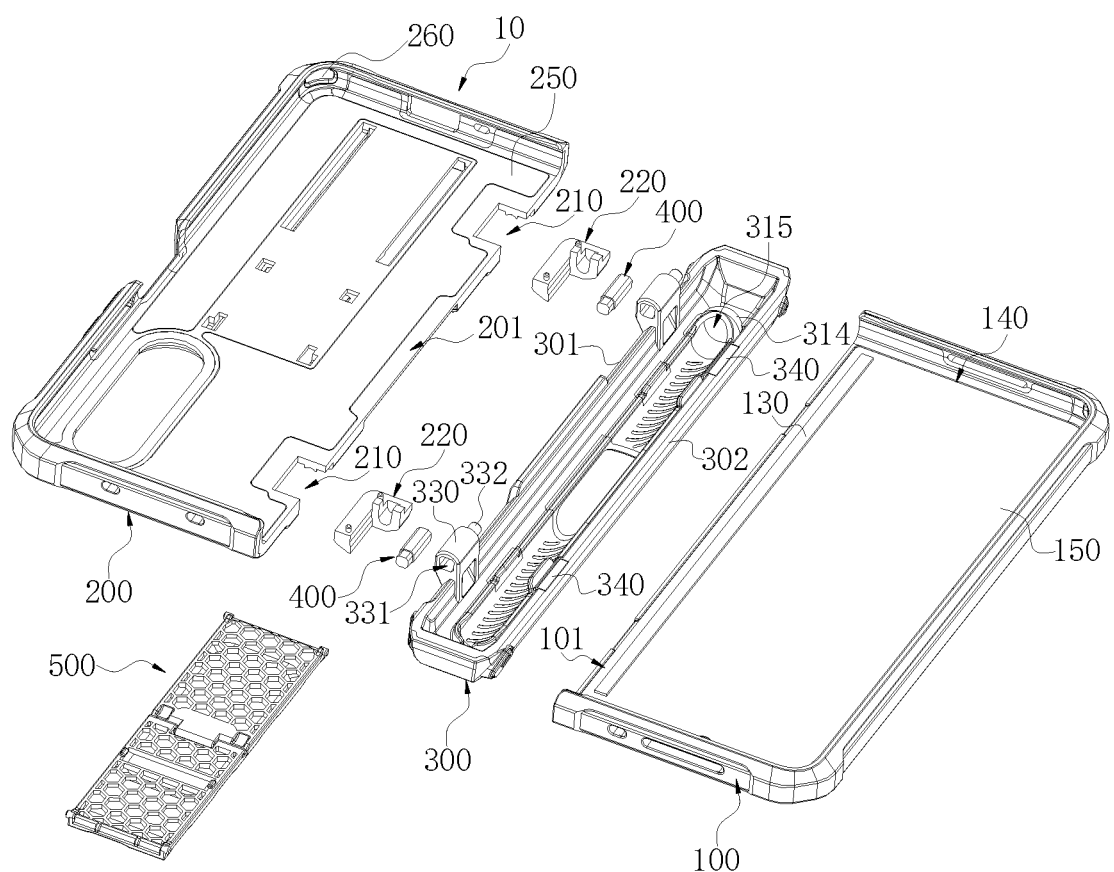
FIG. 12 is an exploded, schematic view of the protective case for folding screen phone shown in FIG. 10.
Figure 13:
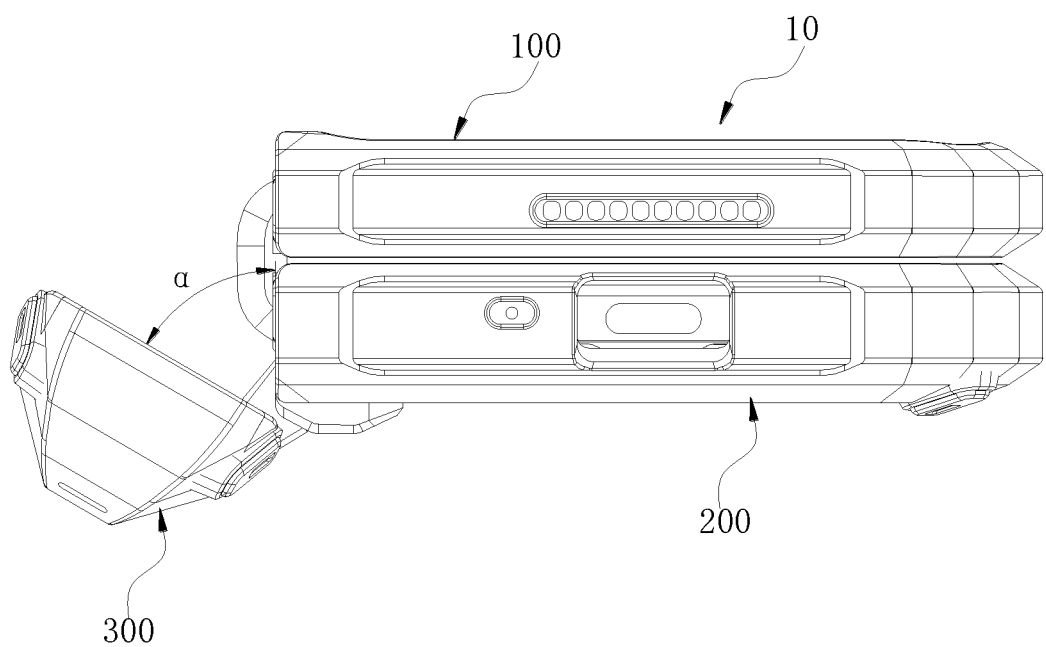
FIG. 13 is a side view of the protective case for folding screen phone shown in FIG. 2 when the side stylus holder rotates to a first angle.
Figure 14:
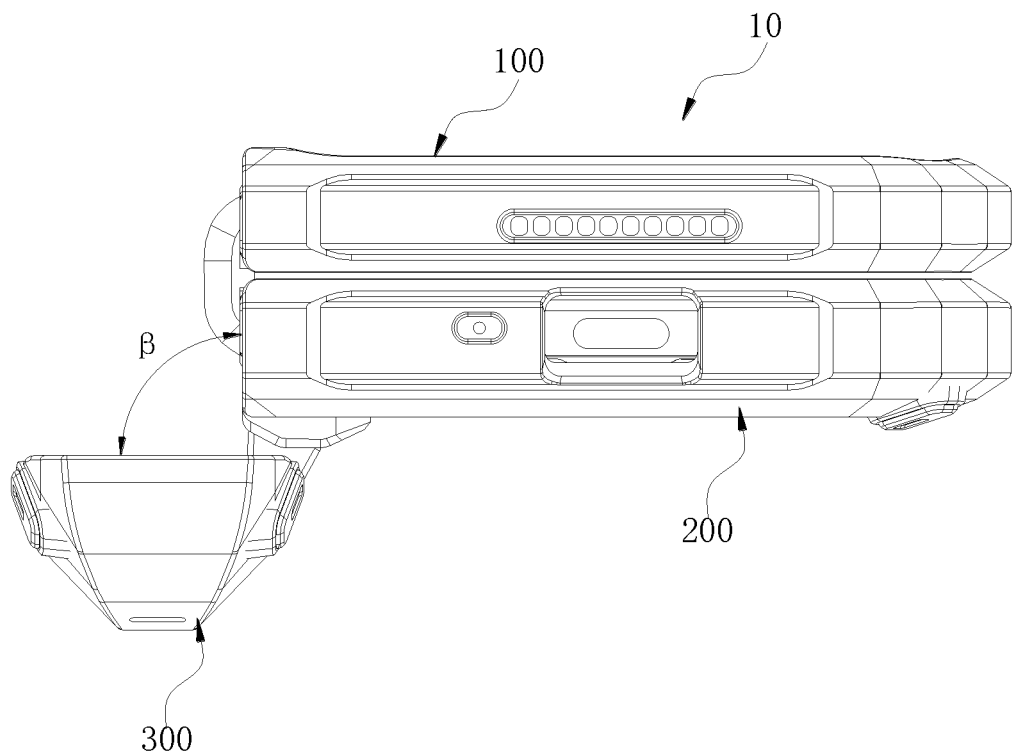
FIG. 14 is a side view of the protective case for folding screen phone shown in FIG. 2 when the side stylus holder rotates to a second angle.
Figure 15:
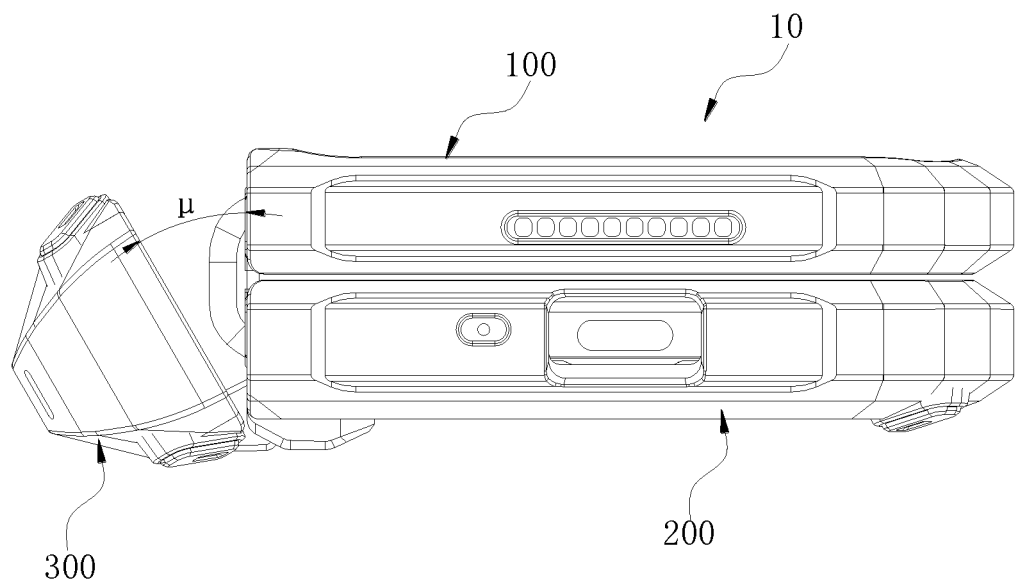
FIG. 15 is a side view of the protective case for folding screen phone shown in FIG. 2 when the side stylus holder rotates to a third angle.

Further, with reference to FIG. 10 to FIG. 12, preferably, the side stylus holder 300 is provided with an extending wall 314 at one end of the first groove 311, and the extending wall 314 and the groove wall of the first groove 311 enclose a protective groove for accommodating a nib 31 of the stylus 30. When the stylus 30 needs to be placed in the side stylus holder 300, firstly the nib 31 of the stylus 30 may be aligned with the protective groove 315 and inserted into the protective groove 315, and then a barrel 32 is slowly rotated and pushed into the first groove 311, such that the stylus 30 is clamped into the first groove 311. The setting of the protective groove 315 further increases the stability of clamping between the stylus 30 and the side stylus holder 300, and the stylus 30 will not disengage from the first groove 311 even when violently shaken, swayed or vibrated violently.

Figure 8:
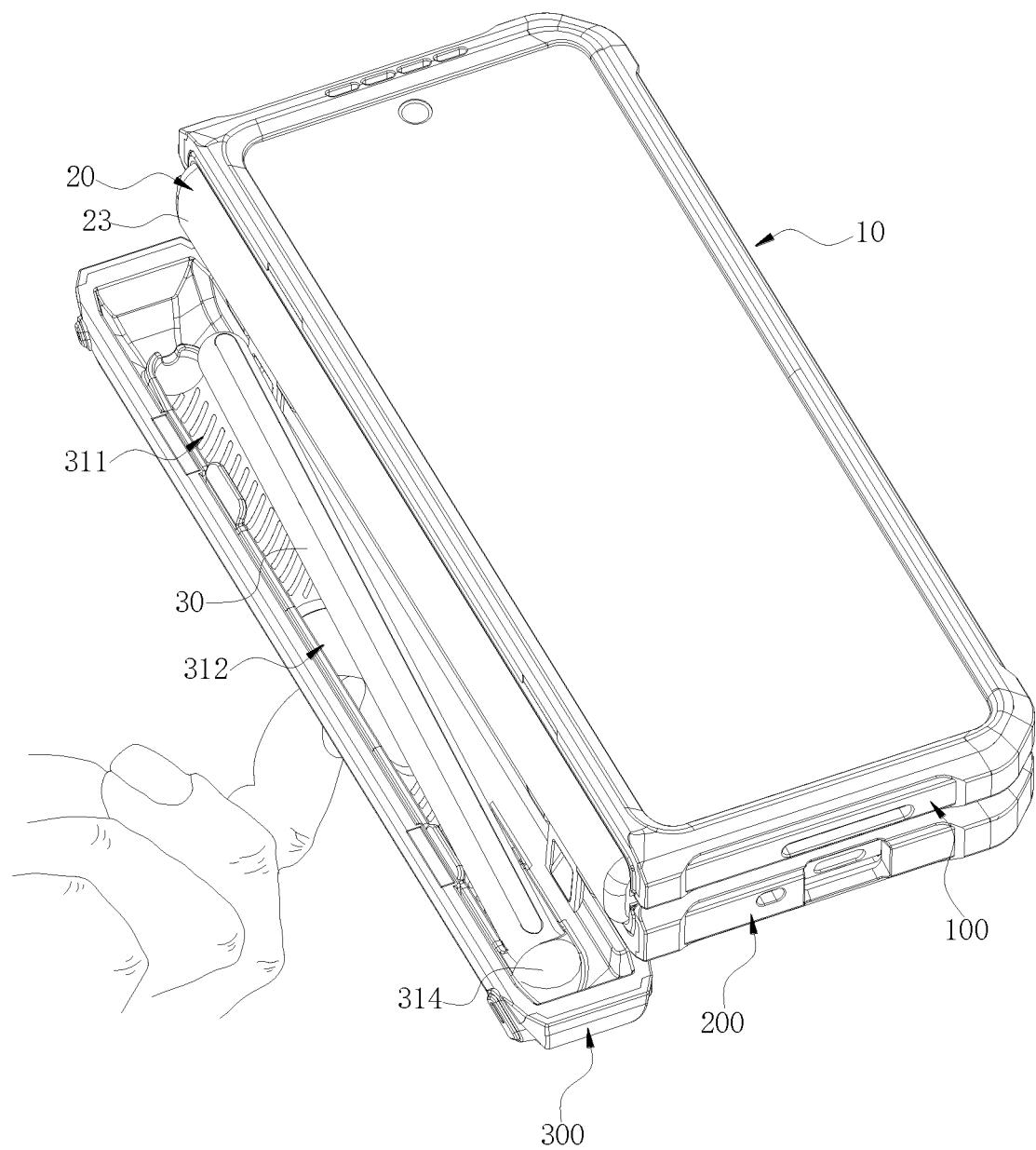
FIG. 8 is a schematic view showing an operation of taking the stylus out of the protective case for folding screen phone shown in FIG. 5.
Figure 9:
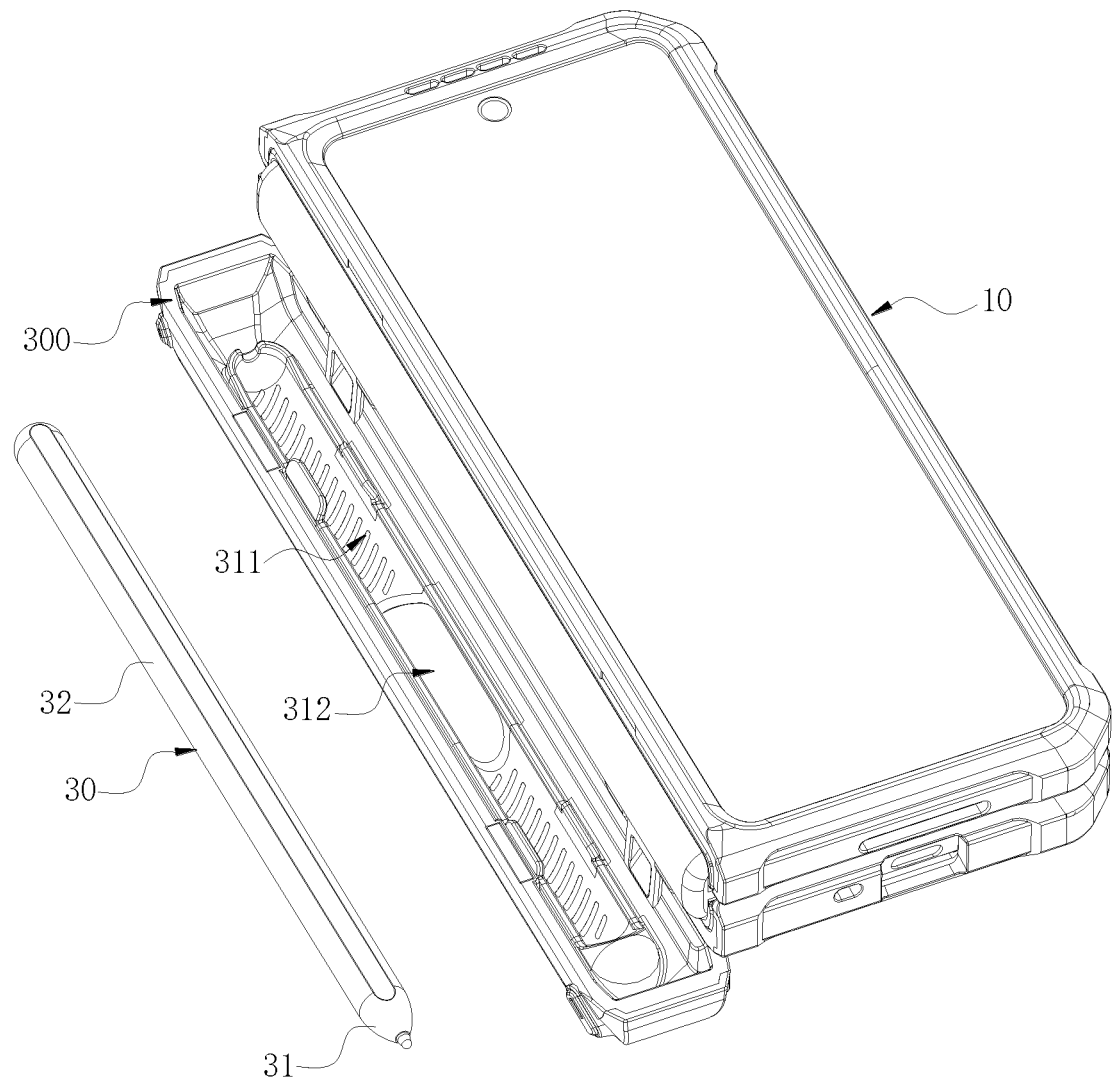
FIG. 9 is a schematic view of the protective case for folding screen phone shown in FIG. 5 after the stylus is taken out.

With reference to FIG. 8, FIG. 9 and FIG. 12 together, when the stylus 30 needs to be taken out of the first groove 311, firstly a finger stirs the stylus 30 through the first through hole 312, such that the stylus 30 may be loosened from the first groove 311 and disengaged from the elastic clamping structure formed by the elastic locking protrusions 313; then the barrel 32 is pinched to apply a force in a direction away from the nib 31, such that the nib 31 is disengaged from the protective groove 315, and the stylus 30 is totally removed, which is simply and conveniently. In this embodiment, the extending wall 314 is disposed at one end of the side stylus holder 300 close to the user, which conforms to people's operation habits and facilitates quickly removal of the stylus 30 from the first groove 311.

Removable glue 130 is affixed to one end of the bottom wall of the first case body 100 close to the side stylus holder 300, that is, the removable glue 130 is disposed at a position of the bottom wall of the first case body 100 close to the opening in the left side. In this way, the first case body 100 is not easy to disengage after being put on the first part 21 of the folding screen phone 20, which increases the stability of assembly between the first case body 100 and the folding screen phone 20. It should be understood that the removable glue 130 may be disposed on an inner surface of the first case body 100 close to the side wall of the side stylus holder 300.

In this embodiment, anti-sliding blocks 11 are disposed at corners of the front and back sides of the side stylus holder 300, and an anti-sliding block 11 is disposed on a corner of the back side of the second case body 200 away from the side stylus holder 300. Particularly, the anti-sliding blocks 11 may be elastic rubber blocks. Providing the anti-sliding blocks 11 may avoid a bottom surface or a top surface of the protective case for folding screen phone 10 from being scratched and improve the shockproof performance, and may avoid large sliding in a process of placing the folding screen phone 20, for example, may avoid the collision when sliding off the desktop onto the ground. That is, the anti-sliding blocks 11 increase a friction force between contact surfaces, and the folding screen phone 20 is not easy to slide and fall down when placed. It should be understood that the anti-sliding block may be disposed at a corner of one end of the front surface of the first case body 100 away from the side stylus holder 300.

An inner surface of the bottom wall of the second case body 200 is provided with a high-density foam layer 250. The high-density foam layer 250 is light in weight, good in resilience, and strong in impact resistance, which may further improve the shockproof performance of the protective case for folding screen phone 10. Particularly, the inner surface of the bottom wall of the second case body 200 is provided with a groove, the high-density foam layer 250 is fixed in the groove by way of bonding, and a portion of the high-density foam layer 250 extends out of the groove. Each corner of the inner surfaces of the first case body 100 and the second case body 200 is provided with a shock-absorbing airbag 260 respectively, for decreasing the vibration. It should be understood that a shock-absorbing airbag may be disposed at the corner of the inner surface of the side stylus holder 300.

The first case body 100 is provided with a second through hole 140 in a region corresponding to the first part 21 of the folding screen phone 20, and the first case body 100 is provided with a transparent protective film 150 at the second through hole 140. A position of the protective film 150 corresponds to the first part 21, and the area of the second through hole 140 is greater than or equal to the display area of the first part 21, such that the first part 21 may be watched through the protective film 150.

Preferably, in this embodiment, the first side 301 of the side stylus holder 300 is rotatably connected to the second case body 200 through the rotating shaft mechanism 400. The second case body 200 may be rotatably connected to the rotating shaft mechanism 400 by means of damping, and the second case body 200 may be in clearance fit with the rotating shaft mechanism 400. The side stylus holder 300 is rotatably connected to the second case body 200 by the rotating shaft mechanism 400, which is more stable than using a flexible connecting belt. Moreover, the rotating shaft mechanism 400 is not easy to damage when scratched, which may be suitable for long-term use. Meanwhile, the difficulty of manufacturing and assembling components of the protective case for folding screen phone 10 is reduced.

Preferably, with reference to FIG. 12 to FIG. 15, in this embodiment, the rotating shaft mechanism 400 is configured such that when the side stylus holder 300 opens to a first angle α, the side stylus holder 300 may automatically flip to a second angle β under the driven of the rotating shaft mechanism 400; and when the side stylus holder 300 rotates to a third angle μ in a closing direction of the side stylus holder 300, the side stylus holder 300 may automatically close under the driven of the rotating shaft mechanism 400. The third angle μ is less than or equal to the first angle α. That is, the side stylus holder 300 has a function of semi-automatic opening and closing under the driven of the rotating shaft mechanism 400. When the side stylus holder 300 rotates and opens beyond the first angle α, the side stylus holder 300 will continue to rotate, and automatically flips and rotates to the second angle β. When the side stylus holder 300 rotates to close to the third angle μ, the side stylus holder 300 will automatically close. In this way, the operations of opening and closing the side stylus holder 300 are facilitated.

Preferably, the second angle β is set to 90 degrees. That is, when the side stylus holder 300 is fully unfolded, an angle of the side stylus holder 300 rotating relative to the second case body 200 is 90 degrees. When the side stylus holder 300 is fully unfolded and hold by the user, the screen of the folding screen phone 20 faces the user directly and will not be skewed, which is convenient to use.

Figure 16:
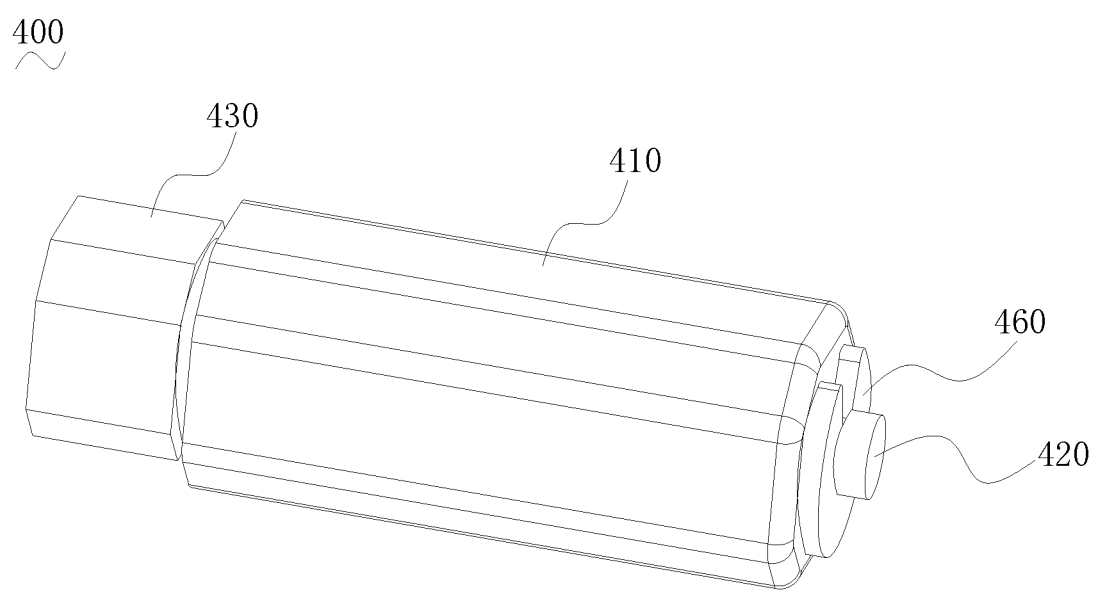
FIG. 16 is a perspective view of a rotating shaft mechanism of the protective case for folding screen phone shown in FIG. 12.
Figure 17:
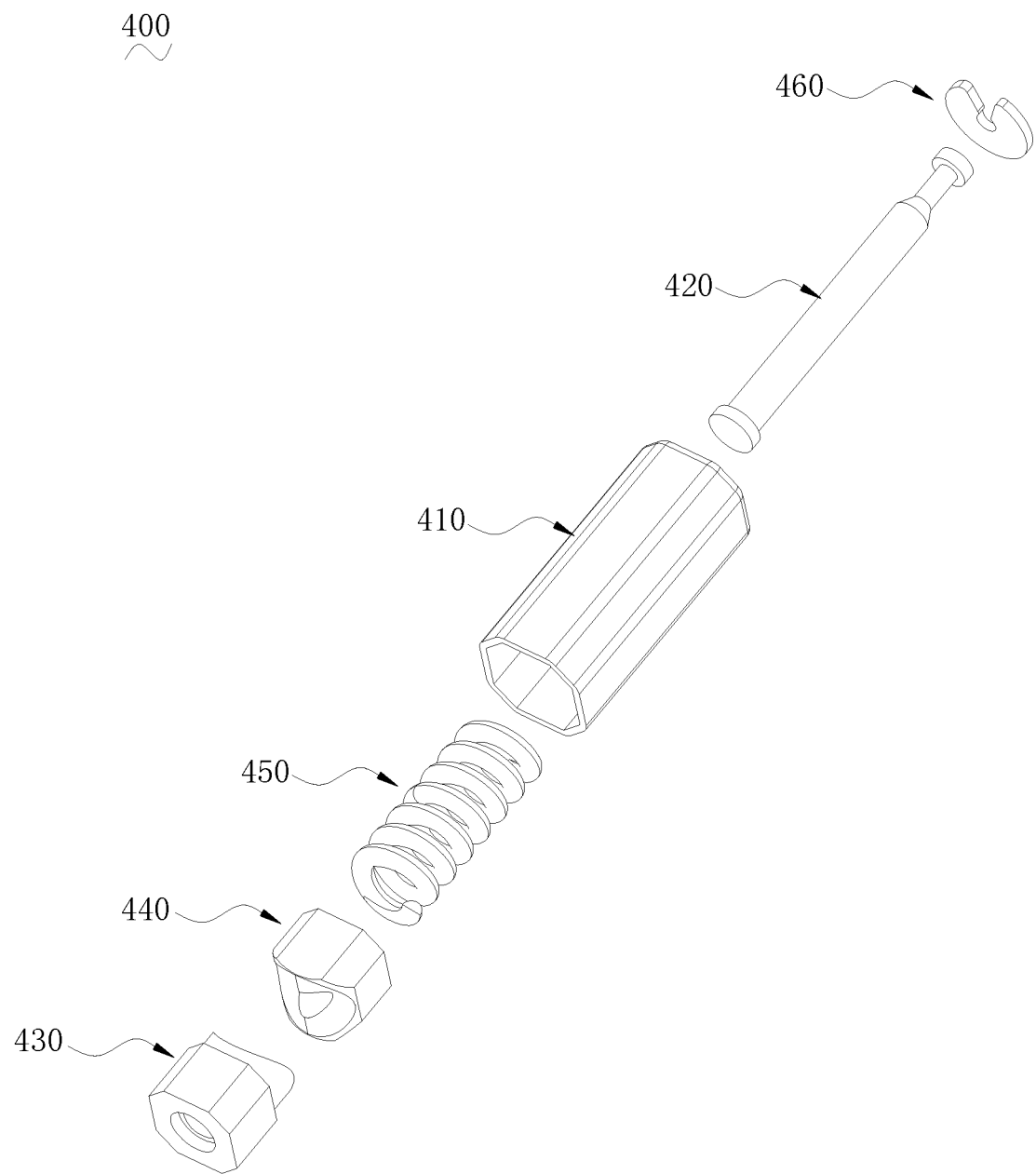
FIG. 17 is an exploded view of the rotating shaft mechanism shown in FIG. 16.
Figure 18:
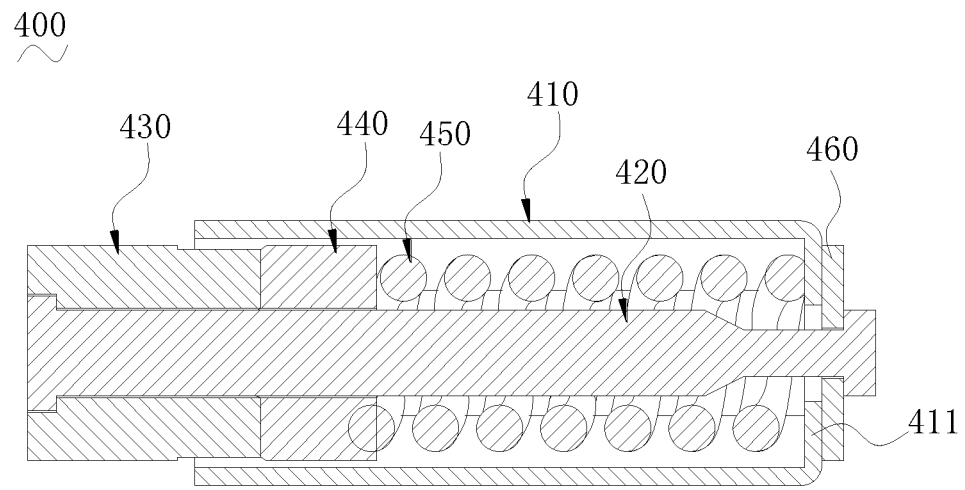
FIG. 18 is a cross-sectional view of the rotating shaft mechanism shown in FIG. 17.

Further, with reference to FIG. 16 to FIG. 18, particularly, in this embodiment, the rotating shaft mechanism 400 includes a casing 410, a shaft core 420 arranged coaxially with the casing 410 and disposed in the casing 410 in a penetrating manner, as well as a first cam 430, a second cam 440 and a compression spring 450 which are sequentially mounted around the shaft core 420. Both the second cam 440 and the compression spring 450 are accommodated in the casing 410. One end of the first cam 430 is fixed to the second case body 200, and the other end of the first cam 430 extends into the casing 410. Longitudinal sections of the casing 410, the first cam 430 and the second cam 440 have the same shape. One end of the casing 410 has an end cover 411, and the other end of the casing 410 is opened for the insertion of the first cam 430. One end of the shaft core 420 passes through the end cover 411 and is fixed to the end cover 411 through a washer 460, and the other end of the shaft core 420 extends into the first cam 430 and is fixedly connected to the first cam 430.

Figure 19:
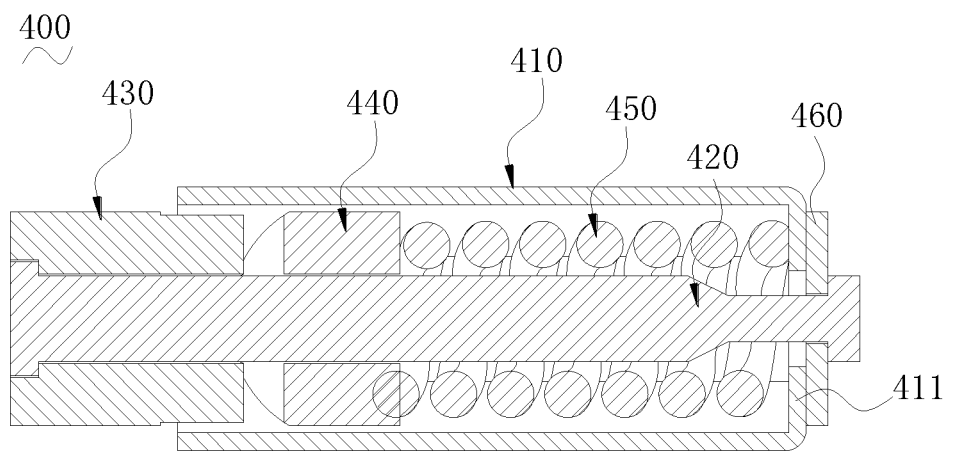
FIG. 19 is a view of the rotating shaft mechanism shown in FIG. 18 at a usage state.
Figure 20:
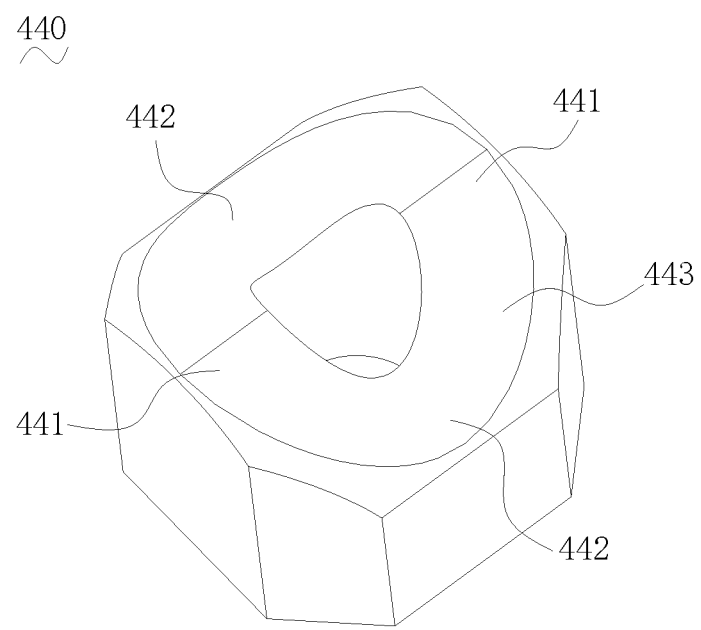
FIG. 20 is a perspective view of a second cam of the rotating shaft mechanism shown in FIG. 17.
Figure 21:
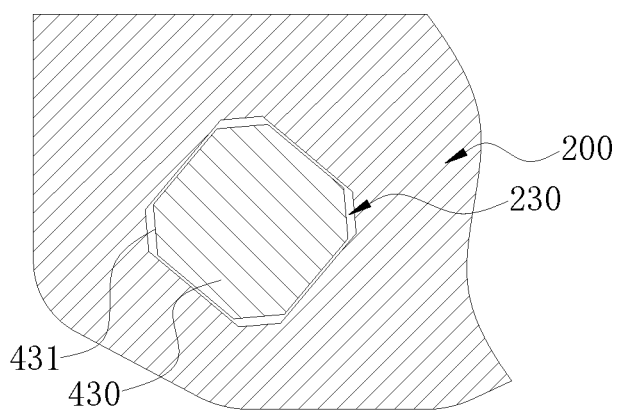
FIG. 21 is a cross-sectional view of an assembly of a first cam of a rotating shaft mechanism and a second case body.
Figure 22:
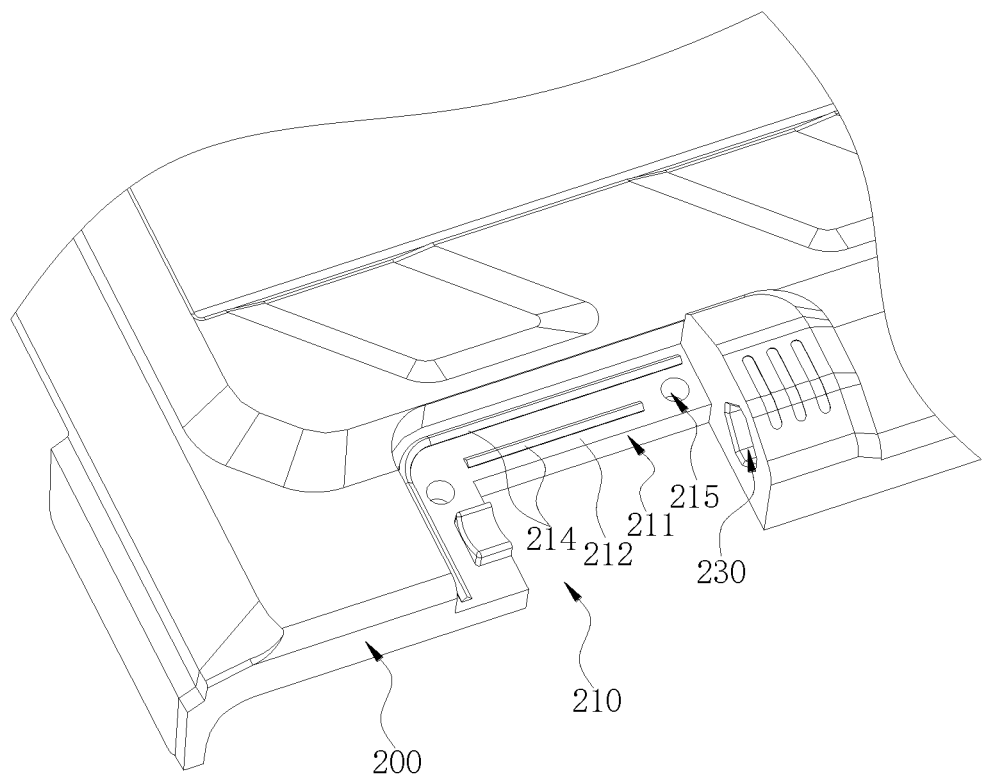
FIG. 22 is a partial, schematic view of the second case body and a fixing block of the protective case for folding screen phone shown in FIG. 12 before fusion welding.
Figure 23:
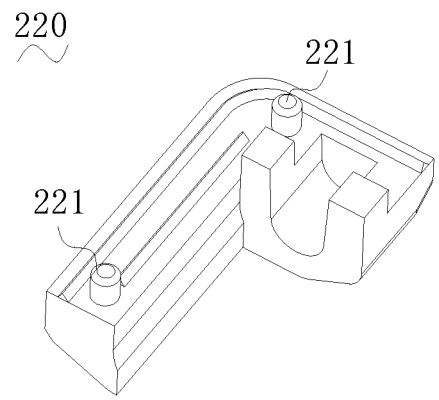
FIG. 23 is a perspective view of the fixing block of the protective case for folding screen phone shown in FIG. 12.
Figure 24:
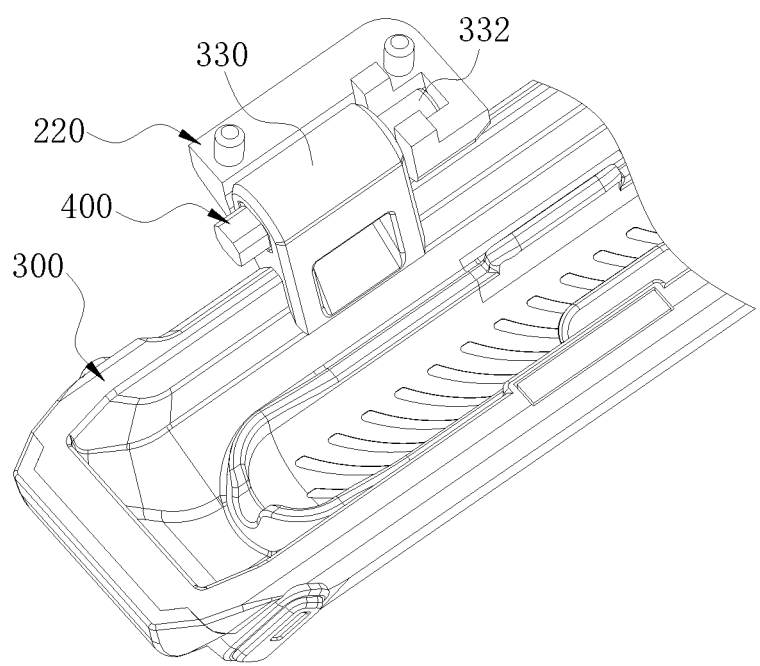
FIG. 24 is a partial schematic view of an assembly of the protective case for folding screen phone shown in FIG. 12.

Further, with reference to FIG. 19 and FIG. 20, one end of the casing 410 provided with the end cover 411 is connected to the side stylus holder 300 and rotates under the driven of the side stylus holder 300. The rotating casing 410 may drive the second cam 440 to rotate. A cam surface of the first cam 430 is matched with and connected to a cam surface of the second cam 440. The second cam 440 may slide in an axial direction of the shaft core 420 under the push of the compression spring 450. A torsional force provided by the compression spring 450 may drive the second cam 440 to rotate in a closing direction of the side stylus holder 300. Particularly, a certain torsional force is formed when the compression spring 450 is mounted within the casing 410, and the torsional force of the compression spring 450 may drive the second cam 440 to rotate relative to the first cam 430, such that a tendency of continuously rotating towards the closing direction is formed when the side stylus holder 300 rotates and closes to a preset angle. That is, the side stylus holder 300 will automatically close after the side stylus holder 300 rotates to the third angle μ.

The cam surface of the first cam 430 and the cam surface of the second cam 440 each include at least two first supporting surfaces 441 and at least two second supporting surfaces 442. The first supporting surfaces 441 and the second supporting surfaces 442 are alternately arranged and connected with each other by a slope surface 443, and the first supporting surfaces 441 are higher than the second supporting surfaces 442. Preferably, in this embodiment, both the first supporting surfaces 441 and the second supporting surfaces 442 are arc-shaped surfaces. The slope surface 443 may be an arc-shaped surface, such that a smooth transition may be formed at connecting positions thereof. The first supporting surfaces 441 and the second supporting surfaces 442 on the first cam 430 are arranged alternately, the first supporting surfaces 441 on the first cam 430 are matched with the second supporting surfaces 442 on the second cam 440, and the second supporting surfaces 442 on the first cam 430 are matched with the first supporting surfaces 441 on the second cam 440. When the side stylus holder 300 drives the casing 410 to rotate, the second cam 440 rotates in the axial direction, and the first cam 430 is fixedly connected to the second case body 200, the cam surface of the first cam 430 may drive the second cam 440 to slide in the axial direction and compress the compression spring 450. When the casing 410 rotates to a preset angle, the cam surface of the first cam 430 is matched with and connected to the cam surface of the second cam 440 again, and the compression spring 450 is reset, such that a function of semi-automatic opening and closing of the side stylus holder 300 may be realized. For the rotating shaft mechanism 400 of this embodiment, the procedure of mounting the components may be simplified, and no torsion spring is needed to provide a driving force for rotating the side stylus holder 300. The rotating shaft mechanism 400 is compact in overall structure, occupies less space, and is easy to assemble.

With reference to FIG. 21 to FIG. 24, the second case body 200 is provided with an accommodating groove 110 for the insertion of the first cam 430. The first cam 430 is fixedly mounted to the second case body 200 through the accommodating groove 110.

Particularly, a longitudinal section of the first cam 430 is a regular polygon with truncated corners. In this embodiment, the longitudinal section of the first cam 430 is a square with truncated corners 431. It should be understood that the longitudinal section of the first cam 430 may be other regular polygons with truncated corners, such as regular pentagons, regular hexagons, and regular octagons. Preferably, both the groove wall of the accommodating groove 110 and the longitudinal section of the first cam 430 are regular polygons with truncated corners, and the side length of the regular polygon formed by the longitudinal section of the groove wall of the accommodating groove 110 is greater than that of the regular polygon formed by the longitudinal section of the first cam 430, and the length of the truncated corner of the longitudinal section of the groove wall of the accommodating groove 110 is less than that of the truncated corner of the longitudinal section of the first cam 430. By configuring the shapes and sizes of the first cam 430 and the accommodating groove 110, one end of the first cam 430 is inserted and fixed to the second case body 200. In order to further facilitate the insertion of the first cam 430 into the accommodating groove 110, a chamfer is provided at an inlet of the groove wall of the accommodating groove 110. In this way, the inlet of the accommodating groove 110 may be enlarged, and the difficulty of aligning the first cam 430 with the accommodating groove 110 and inserting the first cam 430 into the accommodating groove 110 may be reduced.

A central angle corresponding to one side of the square longitudinal section of the first cam 430 may 60 degrees, and a central angle corresponding to one side of the square longitudinal section of the groove wall of the accommodating groove 110 is greater than 60 degrees and less than 70 degrees.

Preferably, in this embodiment, the second case body 200 is provided with a notch 210 in one end thereof close to the side stylus holder 300, a fixing block 220 is provided at the notch 210, and the fixing block 220 and the second case body 200 are fixed together by way of ultrasonic fusion welding. The first side 301 of the side stylus holder 300 is provided with a connecting block 330 at a position corresponding to the notch 210, and the connecting block 330 is formed integrally with the side stylus holder 300. One end of the connecting block 330 is provided with a fixing groove 331 adapted to accommodate one end of the rotating shaft mechanism 400, and an opposite end of the connecting block 330 is provided with an extending shaft 332 in a protruding manner. A mounting groove 230 adapted to accommodate the extending shaft 332 is formed between the fixing block 220 and the second case body 200, and the extending shaft 332 is rotatably mounted within the mounting groove 230.

Particularly, the fixing block 220 has a substantially L-shaped cross section. The second case body 200 is provided with a step 211 at the notch 210, the step 211 has a substantially L-shaped cross section, and a fusion-welding rod 214 and two positioning holes 215 are disposed on a step surface 212 in the step 211 which is parallel to the bottom wall of the second case body 200. The fixing block 220 is provided with a positioning post 221 at a position corresponding to the positioning hole 215 in a protruding manner. During assembly, firstly, one end of the casing 410 of the rotating shaft mechanism 400 is inserted into the fixing groove 331 of the connecting block 330, and then the extending shaft 332 at one side of the connecting block 330 is inserted into the groove of the fixing block 220; and then the two positioning posts 221 of the fixing block 220 are aligned with the two positioning posts 221 on the step surface 212, and then the fixing block 220 is fusion-welded to the second case body 200 by way of ultrasonic fusion welding, such that the fixing block 220 is fusion-welded to the second case body 200, and assembly of the rotating shaft mechanism 400, the second case body 200 and the side stylus holder 300 is completed. Providing the fixing block 220 and employing ultrasonic fusion welding make the assembly of the side stylus holder 300, the rotating shaft mechanism 400 and the second case body 200 more stable, the assembly process is less, the assembly is simpler, and the assembly difficulty is reduced. The rotating shaft mechanism 400 will not disengage from the side stylus holder 300 or the second case body 200 after assembled, the stability is improved and the service life of the protective case for folding screen phone 10 is prolonged. It should be understood that an initial shape of the fixing block 220 may be different from that shown in FIG. 22. After assembling of the rotating shaft mechanism 400, the back side of the fixing block 220 may be polished to makes a connection portion of the back side of the fixing block 220 and the second case body 200 transition smoothly. The back side of the fixing block 220 is substantially flush with the back side of the second case body 200, such that the protective case for folding screen phone 10 is flat and beautiful as a whole.

It should be understood that the side stylus holder 300 can be rotatably connected to the second case body 200 through other mechanisms or assemblies; the side stylus holder 300 may be in a fully automatic closing fashion. That is, when the side stylus holder 300 is in an unfolded state, the side stylus holder 300 has a tendency to rotate towards the closing direction; when the folding screen phone 20 is folded, the side stylus holder 300 may automatically close without a force applied thereon.

Figure 25:
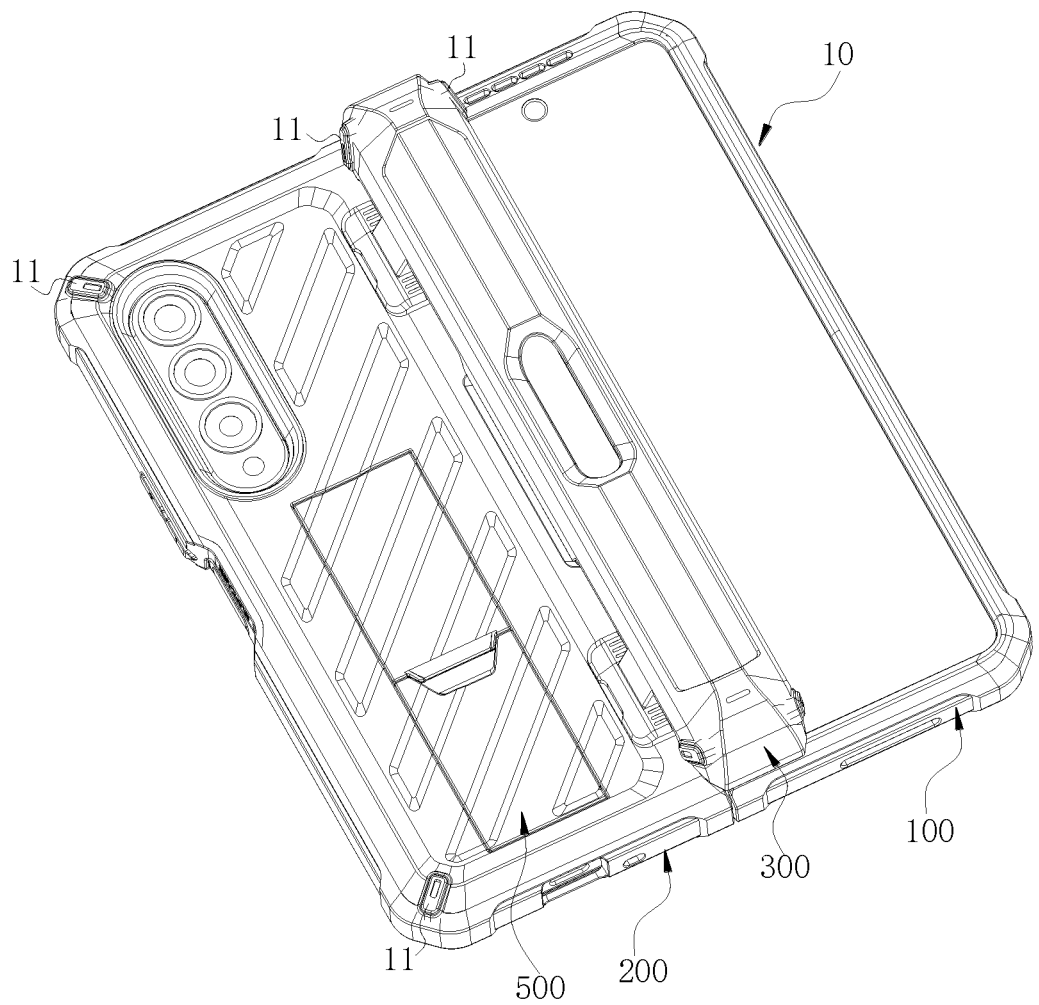
FIG. 25 is a perspective view of the protective case for folding screen phone of FIG. 6 from another angle, wherein a stand is in a folded state.
Figure 26:
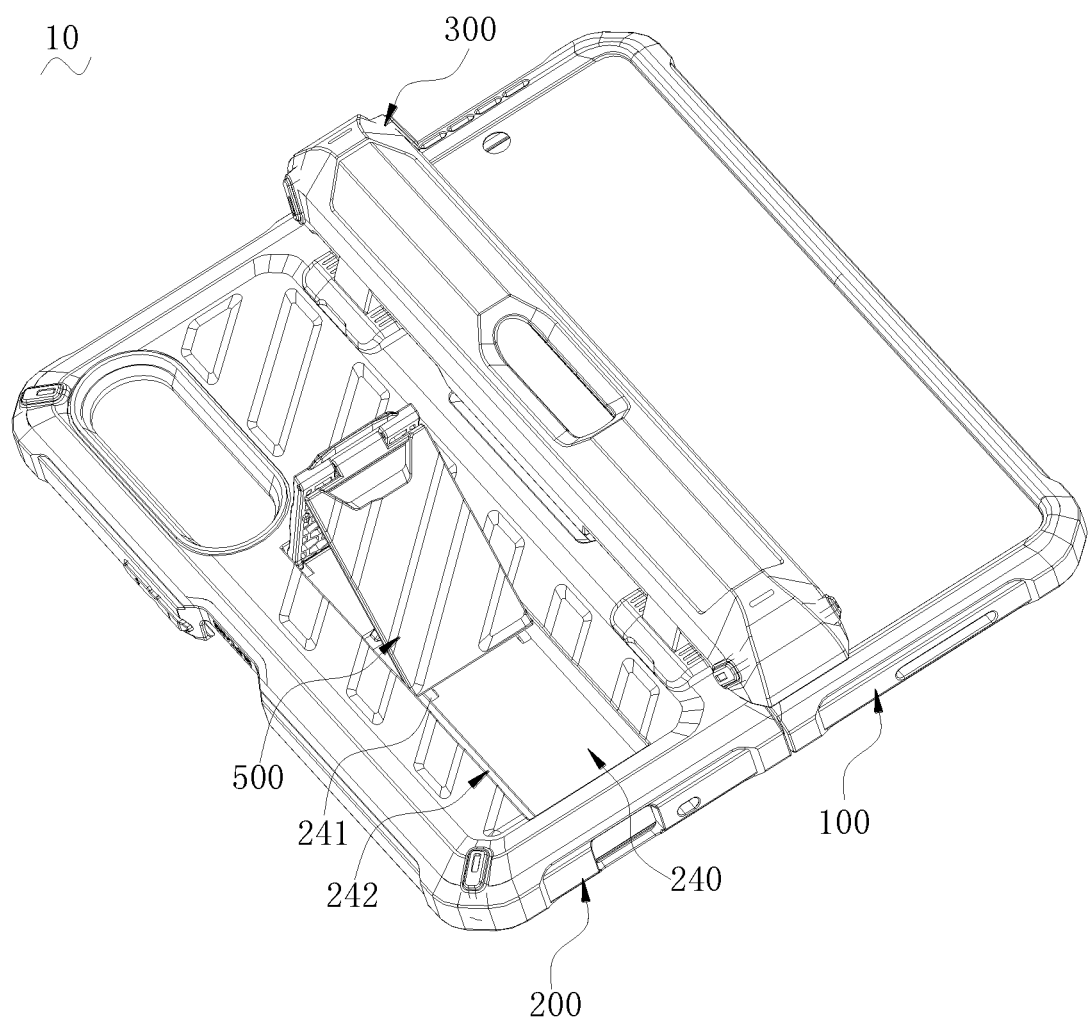
FIG. 26 is a perspective view of the protective case for folding screen phone of FIG. 10 from another angle, wherein the stand is in an unfolded state.
Figure 27:
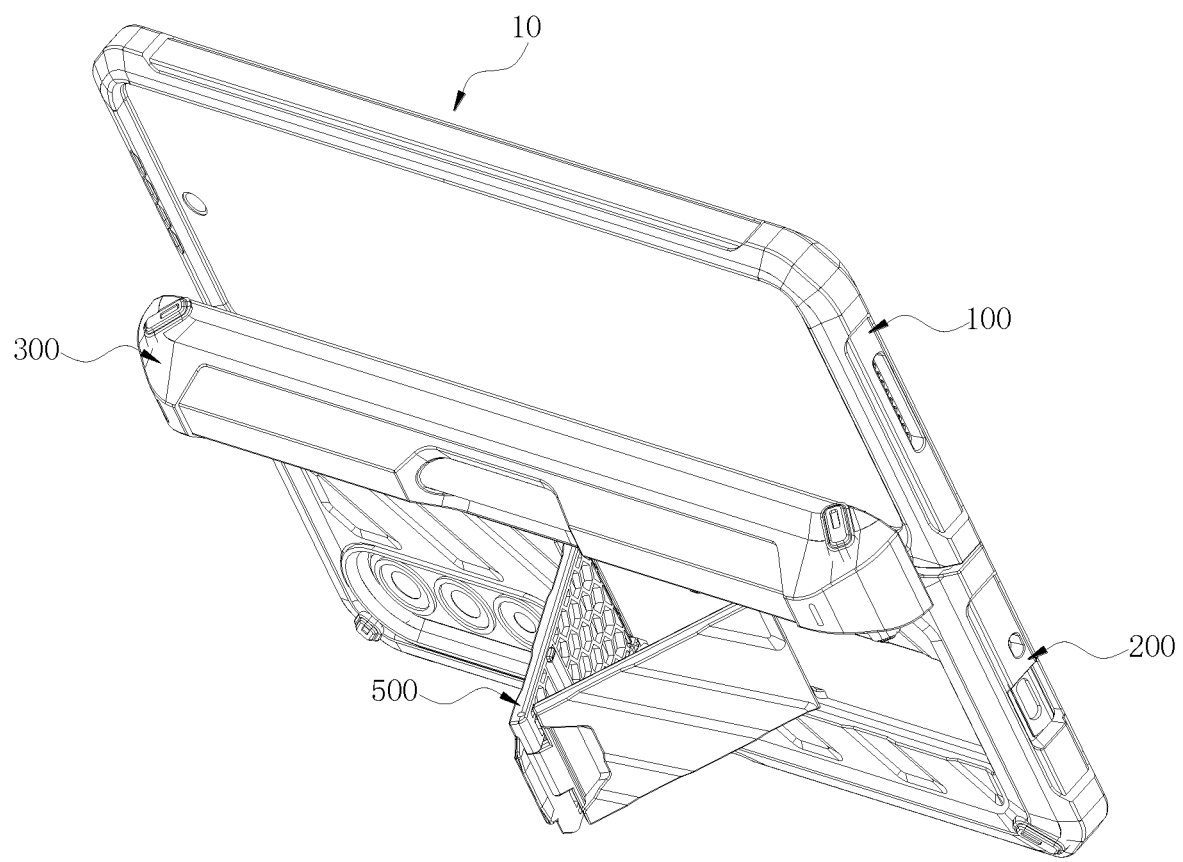
FIG. 27 is a perspective view of the protective case for folding screen phone of FIG. 6 from another angle, wherein the stand is in an unfolded state.

With reference to FIG. 25 to FIG. 27, a stand 500 is rotatably connected to the back side of the bottom wall of the second case body 200. The stand 500 may open or close relative to the second case body 200, that is, the stand 500 may be folded or unfolded. When the stand 500 is unfolded and the folding screen phone 20 is unfolded, a stable supporting structure may be formed by the stand 500 and the protective case for folding screen phone 10, which provides a supporting to the folding screen phone 20 and facilitates the user to watch or operate the screen. When the stand 500 is unfolded and the folding screen phone 20 is unfolded, no interference exists between the unfolded side stylus holder 300 and a horizontal supporting surface, and the folding screen phone 20 may be stably placed on the horizontal supporting surface.

When the stand 500 is opened, the stand has a V-shaped longitudinal section, and a longitudinal section enclosed by the opened stand 500 and the bottom surface of the second case body 200 is an isosceles triangle. When the stand 500 opens and the folding screen phone 20 is unfolded, the folding screen phone 20 may be stably placed on the horizontal supporting surface by using the bottom of any one of the first case body 100 and the second case body 200 as a supporting end. That is, when the stand 500 opens, the folding screen phone 20 may be used in two directions without falling over.

Figure 28:
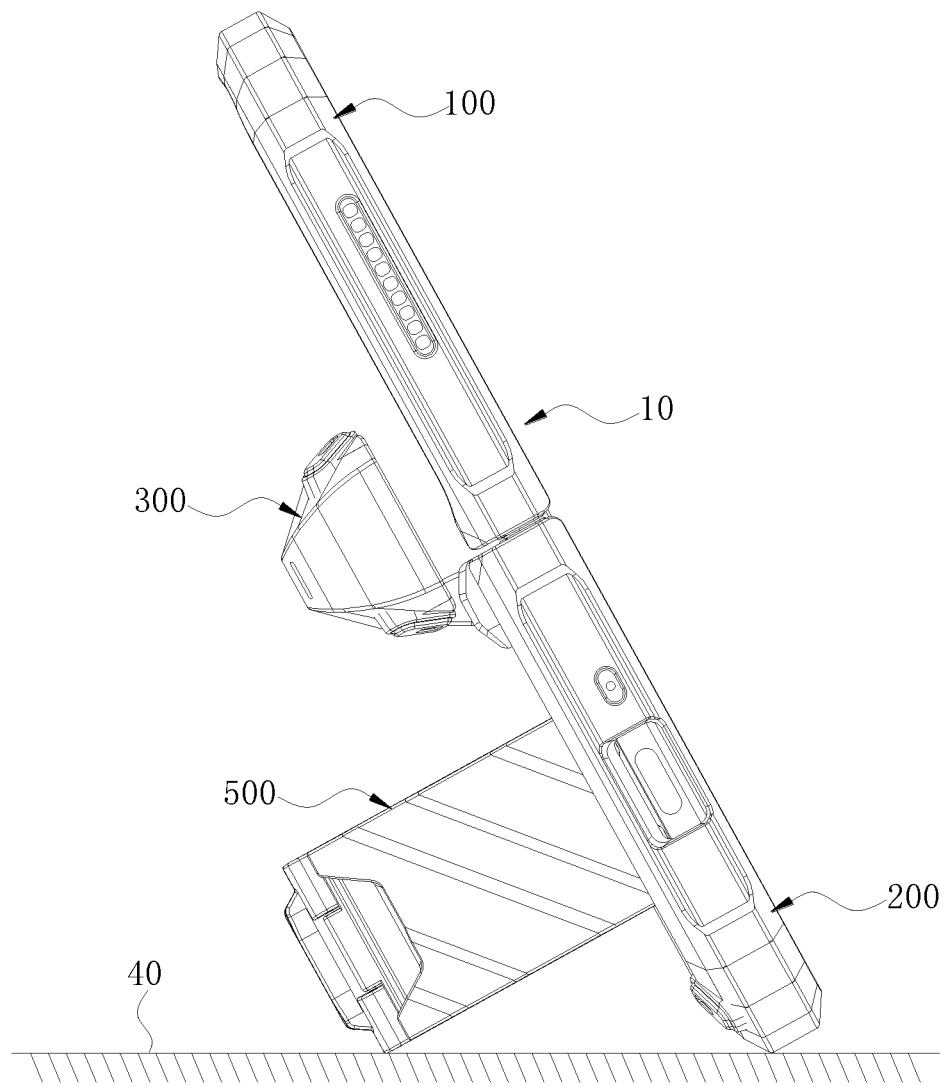
FIG. 28 is view of a first usage state of the protective case for folding screen phone shown in FIG. 27.
Figure 29:
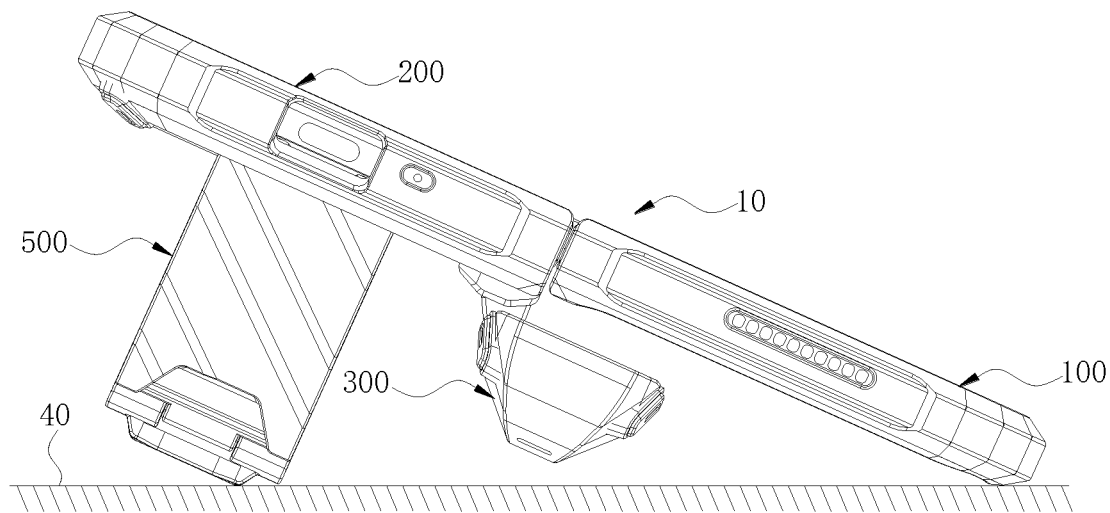
FIG. 29 is view of a second usage state of the protective case for folding screen phone shown in FIG. 27.
Figure 30:
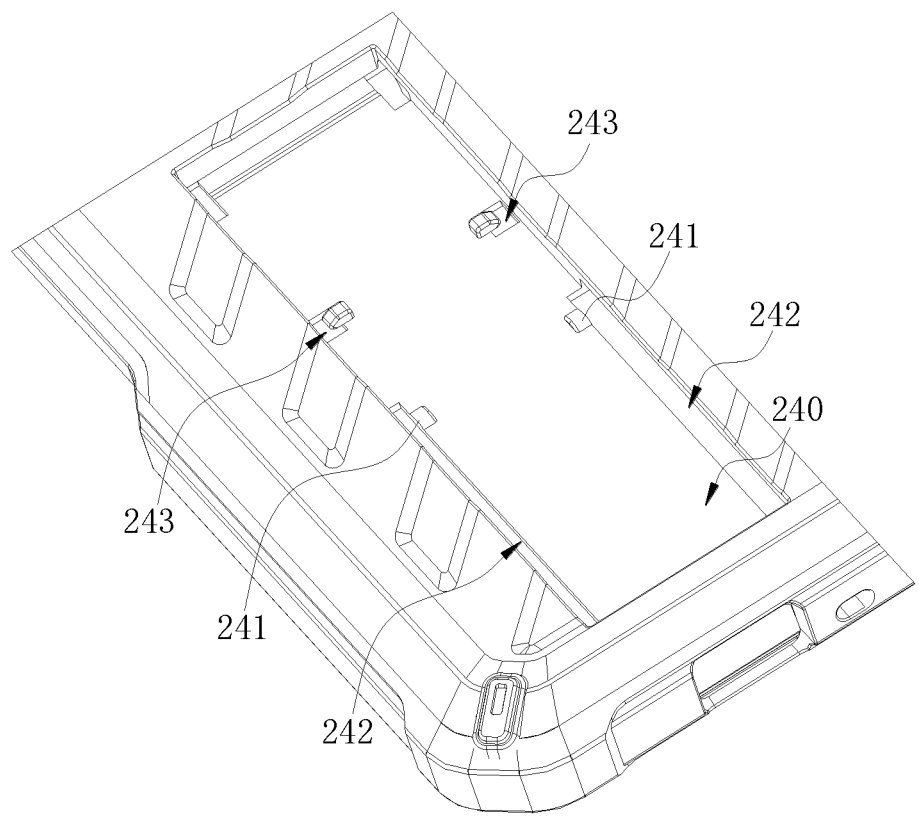
FIG. 30 is a partial schematic view of a structure of the second case body of the protective case for folding screen phone shown in FIG. 27.
Figure 31:
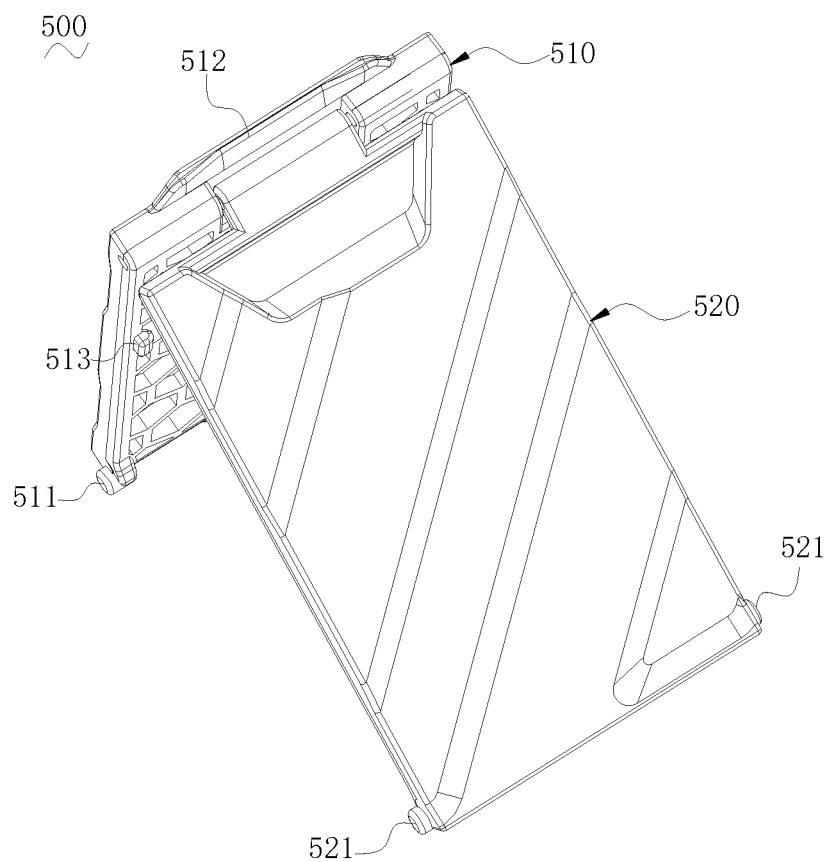
FIG. 31 is a perspective view of the stand of the protective case for folding screen phone shown in FIG. 27.
Figure 32:
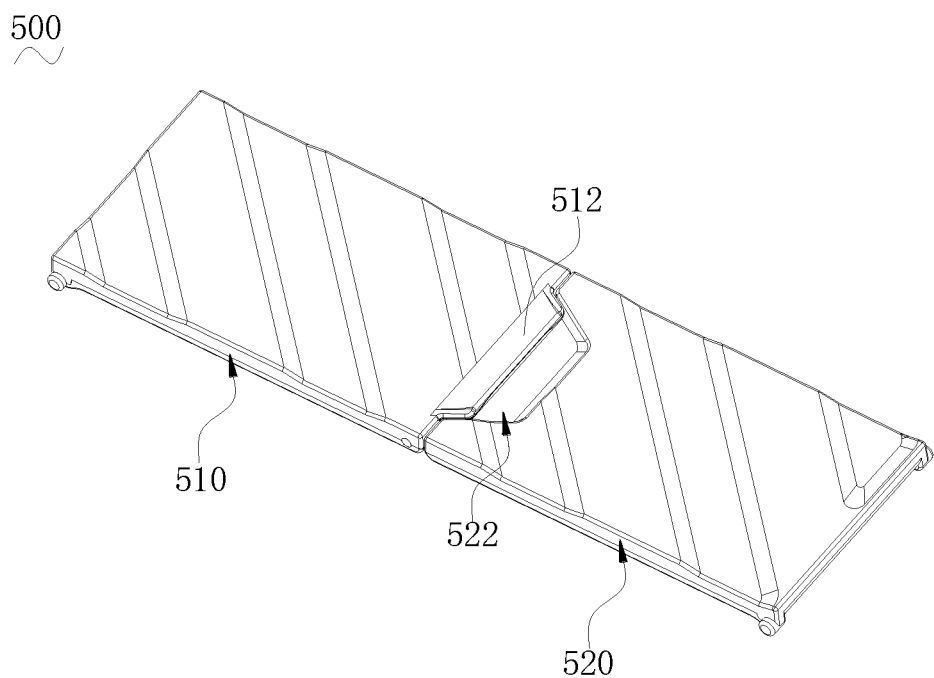
FIG. 32 is a perspective view of the stand shown in FIG. 31 when folded.
Figure 33:
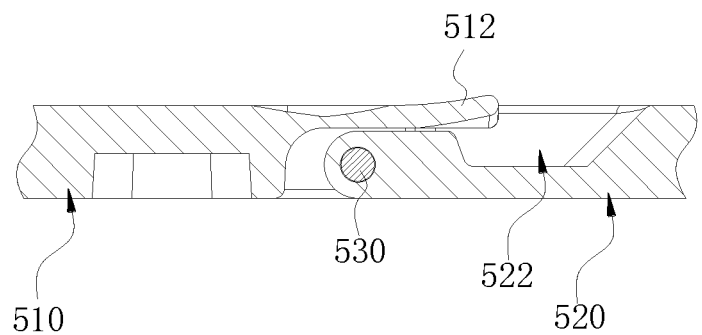
FIG. 33 is a partial cross-sectional view of the stand shown in FIG. 32.

That is, when the stand 500 is unfolded, the folding screen phone 20 may be stably placed on the horizontal supporting surface in two ways. As shown in FIG. 28, when the stand 500 is unfolded, both the stand 500 and the second case body 200 abut against the horizontal supporting surface 40 at the same time, which may facilitate the user to watch the screen. As shown in FIG. 29, when the stand 500 is unfolded, both the stand 500 and the first case body 100 abut against the horizontal supporting surface 40 at the same time, and a gap is defined between the unfolded side stylus holder 300 and the horizontal supporting surface 40. Placing the folding screen phone 20 in this way may facilitate the operation of the screen, such as using a virtual keyboard for performing input operation or other operations. The stand 500 on the back side of the protective case for folding screen phone 10 may be stably placed on the horizontal supporting surface 40 in two ways, which may effectively expand usage scenario of the folding screen phone 20, improve use experience of the user, and meet different usage requirements. When the stand 500 is unfolded, the stand may serve as a hand clasp, that is, the finger may be inserted into the stand 500 to stably lift and hold the folding screen phone 20, which brings the convenience to use.

The back side of the second case body 200 is provided with a second groove 240, and the stand 500 may be accommodated in the second groove 240 when closing. A length direction of the second groove 240 is parallel to that of the second case body 200, and a shape enclosed by the groove wall of the second groove 240 is substantially rectangular. When the stand 500 is folded and received in the second groove 240, the stand 500 is hidden in the second case body 200, the back side of the stand 500 is flush with or lower than the back side of the second case body 200, and thus the protective case for folding screen phone 10 is flat and beautiful.

Further, with reference to FIG. 30 to FIG. 33, particularly, in this embodiment, the stand 500 includes a first supporting plate 510 and a second supporting plate 520. One end of the first supporting plate 510 is hinged within the second groove 240, and the other end of the first supporting plate 510 is hinged with one end of the second supporting plate 520 through the shaft 530. The other end of the second supporting plate 520 is slidably disposed within the second groove 240. The widths and the lengths of the first supporting plate 510 and the second supporting plate 520 may be equal to each other, respectively, and the width of the first supporting plate 510 is slightly less than that of the second groove 240. The first supporting plate 510 is provided with a mounting post 511 on both sides in a width direction of one end thereof which is away from the second supporting plate 520 respectively, and the second case body 200 may be provided with a groove adapted to accommodate the mounting post 511 at one end of the second groove 240. In this way, the first supporting plate 510 may be hinged with the second case body 200 through the mounting posts 511 on both sides.

At least one limiting protrusion 241 is formed in the second groove 240. The limiting protrusion 241 is configured to restrict the other end of the second supporting plate 520 from sliding towards a second direction when the other end of the second supporting plate 520 slides over the limiting protrusion 241 in a first direction. The first direction is opposite to the second direction, and the first direction is parallel to a length direction of the second groove 240. In this embodiment, two limiting protrusions 241 at intervals are formed in the second groove 240, and the two limiting protrusions 241 are symmetrically arranged on both sides of the second groove 240 in a width direction. Surfaces of the limiting protrusions 241 away from the first case body 100 are arc-shaped surfaces, which facilitate the sliding operation of the second supporting plate 520, reduce the friction between the second supporting plate 520 and the limiting protrusions 241, and may make the second supporting plate 520 slide over the limiting protrusions 241 with a small force.

Preferably, one end of the first supporting plate 510 close to the second supporting plate 520 is provided with a folding portion 512, and the folding portion 512 bent towards a side away from the back side of the second case body 200. The folding portion 512 is disposed on the first supporting plate 510, facilitating the user to unfold the stand 500. During a specific operation, the first supporting plate 510 may be buckled up from the second groove 240 by applying a force to the folding portion 512 with fingers or other objects. At this time, one end of the second supporting plate 520 close to the first supporting plate 510 is disengaged from the second groove 240, such that the stand 500 is unfolded. The stand 500 is conveniently unfolded and brings the convenience to use. One end of the second supporting plate 520 close to the first supporting plate 510 is provided with an escaping groove 522 for accommodating the folding portion 512. Meanwhile, it is convenient for inserting the finger to apply a force to the folding portion 512.

Two sides of the second groove 240 in the width direction are provided with a sliding groove 242 respectively, and two sides of the second supporting plate 520 in the width direction are provided with a guiding post 521 respectively. The guiding post 521 is formed integrally with the second supporting plate 520. The guiding post 521 is slidably matched with the sliding groove 242 in the corresponding side. The second supporting plate 520 is slidably matched with the sliding groove 242 through the guiding posts 521 on both sides. The length of the sliding groove 242 is less than that of the second groove 240. When the second supporting plate 520 slides over the limiting protrusions 241, one side of the second supporting plate 520 abuts against the groove wall of the sliding groove 242. At this time, the second supporting plate 520 slides to the maximum stroke.

A groove bottom of the second groove 240 is provided with a locking hole 243, and a locking block 513 is disposed at a corresponding position of the first supporting plate 510. When the stand 500 is folded and accommodated in the second groove 240, the locking block 513 on the first supporting plate 510 is clamped into the locking hole 243, such that the stand 500 will not be disengaged from the second groove 240 due to its own weight, and the stand 500 is prevented from being automatically unfolded from the second case body 200 during using of the protective case for folding screen phone 10. In a process of unfolding the stand 500, the locking block 513 on the first supporting plate 510 is disengaged from the locking hole 243 by applying the force onto the folding portion 512, such that the first supporting plate 510 and the second supporting plate 520 may be unfolded for use.

Figure 34:
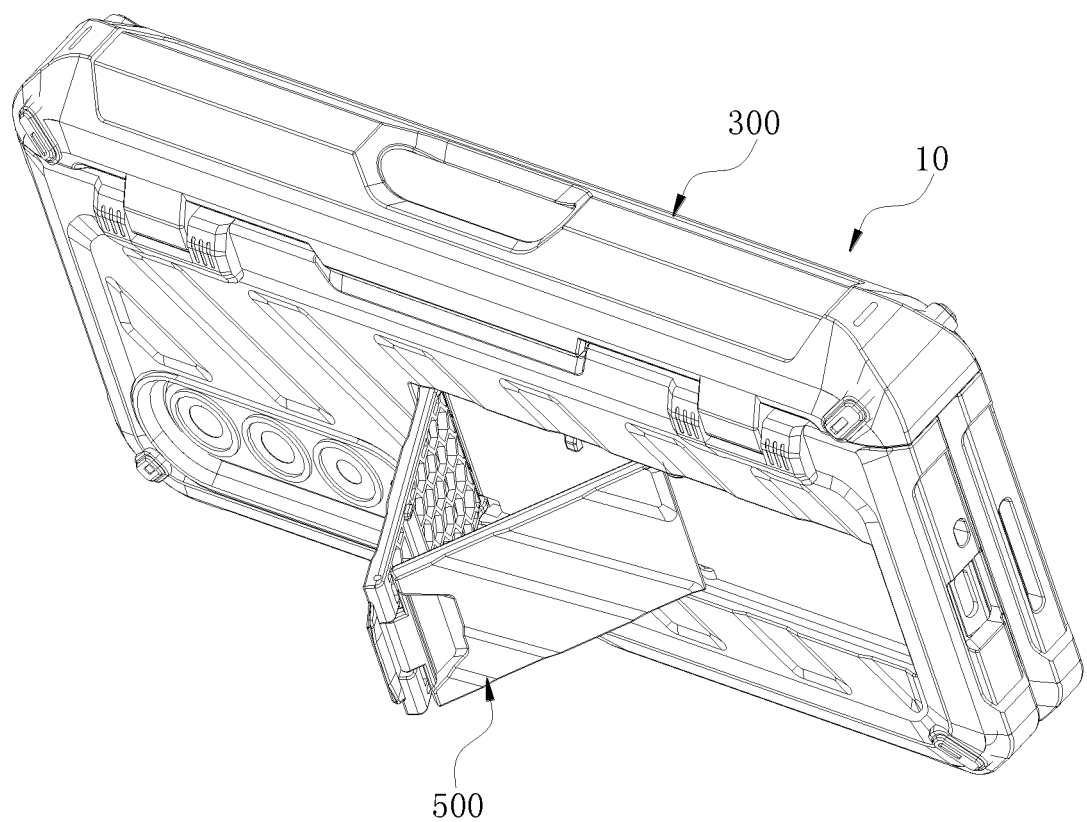
FIG. 34 is a schematic view of a usage state of the protective case for folding screen phone shown in FIG. 1.

It should be understood that the stand 500 and the side stylus holder 300 may be folded or unfolded according to different usage requirements. As shown in FIG. 34, when the folding screen phone 20 is not required to be unfolded, the side stylus holder 300 is in a folded state, and the stand 500 on the back side is opened for use. In other usage scenarios, the stand 500 on the back side may not be opened. When the folding screen phone 20 is not required to be folded, the side stylus holder 300 may be unfolded to abut against the horizontal supporting surface, playing a supporting role.

When the stand 500 is unfolded, a space enclosed between the stand 500 and the second case body 200 may allow at least one finger to pass through, such that the protective case for folding screen phone 10 is held by the at least one finger, which brings the convenience to use. Preferably, the stand 500 is in the unfolded state, and the space enclosed between the stand 500 and the second case body 200 may allow one finger, such as a middle finger of one hand to pass through. In this way, after the finger passes through the space, the protective case for folding screen phone 10 can be stably and conveniently hold by one hand.

The above descriptions are only preferred embodiments of the present disclosure and are not intended to limit the present disclosure. Any modification, equivalent replacement and improvement made within the spirit and the principle of the present disclosure shall be included within the protection scope of the present disclosure.

What is claimed is:

1. A protective case for folding screen phone, the folding screen phone comprising a first part with a first screen and a second part with a second screen, the first part and the second part being rotatably connected to each other-through a hinge, the protective case for folding screen phone comprising:
a first case body, configured for accommodating the first part of the folding screen phone, wherein the first case body comprises a first open side configured for exposing the first screen;
a second case body, configured for accommodating the second part of the folding screen phone, wherein the second case body comprises a second open side configured for exposing the second screen; and
a rotatable stylus engaging holder with a stylus engaging groove configured for accommodating a stylus therein, wherein the rotatable stylus engaging holder comprises a third open side configured for assembly the stylus into the stylus engaging groove and/or disassembly the stylus from the stylus engaging groove, the third open side of the rotatable stylus engaging holder comprising opposite first and second edges, the first edge of the third open side of the rotatable stylus engaging holder being rotatably supported by the second case body, the rotatable stylus engaging holder being rotatable relative to both the first case body and the second case body about the first edge of the third open side between a first position in which the second edge of the third open side is away from the first case body and a second position in which the second edge of the third open side is close to the first case body, wherein the stylus engaging groove of the rotatable stylus engaging holder is rotatable along with the rotatable stylus engaging holder relative to both the first case body and the second case body to make the third open side be covered or exposed;

wherein the protective case comprises at least a first state, a second state and a third state, in the first state, the first and second case bodies are folded to make the first open side and the second open side overlap with each other; and the rotatable stylus engaging holder is at the second position, making the third open side be substantially perpendicular to the first and second open sides and covered by the folded first and second case bodies;

in the second state, the first and second case bodies are folded to make the first open side and the second open side overlap with each other; and the rotatable stylus engaging holder is at the first position, making the third open side be substantially parallel to the first and second open sides and exposed; and in the third state, the first and second case bodies are unfolded to make the first open side and the second open side be coplanar; and the rotatable stylus engaging holder is at the first position, making the third open side be substantially parallel to the first and second open sides and covered by the unfolded first case body.

2. The protective case for folding screen phone according to claim 1, wherein a cross section of the stylus engaging groove of the rotatable stylus engaging holder is substantially U-shaped.

3. The protective case for folding screen phone according to claim 1, wherein the first part and the second part of the folding screen phone are rotatably connected to each other through a hinge, an accommodating cavity is concaved inwardly from the third open side of the rotatable stylus engaging holder, and the stylus engaging groove is further concaved inwardly from a bottom of the accommodating cavity with a step formed between the stylus engaging groove and the accommodating cavity; and wherein the rotatable stylus engaging holder covers the hinge when the protective case in the first state, and the accommodating cavity provides a space between the stylus accommodated in the stylus engaging groove and the hinge.

4. The protective case for folding screen phone according to claim 3, wherein the hinge is partly received in the accommodating cavity when the protective case in the first state.

5. The protective case for folding screen phone according to claim 3, wherein elastic locking protrusions are provided in the accommodating cavity and located at two opposite sides of an open side of the stylus engaging groove, and the stylus is partly received in the stylus engaging groove and clamped by the elastic locking protrusions when the the stylus is engaged in the stylus engaging groove.

6. The protective case for folding screen phone according to claim 3, wherein the rotatable stylus engaging holder is provided with an extending wall at the bottom of the accommodating cavity on one end of the stylus engaging groove, and the extending wall and a groove wall of the stylus engaging groove enclose a protective groove for accommodating one end of the stylus.

7. The protective case for folding screen phone according to claim 3, wherein the rotatable stylus engaging holder further comprises a protruding rib provided at the bottom of the accommodating cavity along a circumference of an open side of the stylus engaging groove, the protruding rib is distant from the first edge and the second edge of the third open side and a gap is defined in the rib at one end of the stylus engaging groove.

8. The protective case for folding screen phone according to claim 1, wherein a first block is embedded in the second edge of the third open side of the rotatable stylus engaging holder, a second block is embedded in a side of the first case body close to the rotatable stylus engaging holder, and the first and second blocks attract each other to make the second edge of the third open side of the rotatable stylus engaging holder be detachably connected to the first case body when the protective case in the first state.

9. The protective case for folding screen phone according to claim 8, wherein one of the first and second blocks is a magnet block, and the other one of the first and second blocks is a magnet block or a stainless steel block.

10. The protective case for folding screen phone according to claim 8, wherein the second edge of the third open side of the rotatable stylus engaging holder is pushed to rotate about the first edge from the second position to the first position by the first case body during unfolding the first screen and the second screen of the folding screen phone.

11. The protective case for folding screen phone according to claim 1, wherein the first edge of the third open side of the rotatable stylus engaging holder is rotatably connected to the second case body through a rotating shaft mechanism, and the rotating shaft mechanism comprises a casing connected to the rotatable stylus engaging holder, a first cam connected to the second case body, a second cam rotating along with the casing, and a compression spring sandwiched between the casing and the second cam, the first cam providing a first cam surface at an axial end thereof, the second cam providing a second cam surface at an axial end thereof, and the first cam surface and the second cam surface abutting against each other, and wherein the rotating shaft mechanism further comprises a shaft core arranged coaxially with the casing, the first cam is fixedly connected to the shaft core, the second cam is rotatably mounted around the shaft core, and the compression spring is slidably mounted around the shaft core.

12. The protective case for folding screen phone according to claim 1, wherein the second case body is separated from the first case body.

13. The protective case for folding screen phone according to claim 1, wherein when the rotatable stylus engaging holder rotates to the second position, the rotatable stylus engaging holder is biased by a spring such that the second edge of the third open side is urged towards the first case body.

14. The protective case for folding screen phone according to claim 1, wherein the rotatable stylus engaging holder comprises a first sidewall extending from the first edge of the third open side and a second sidewall extending from the second edge of the third open side, the first sidewall and the second sidewall are inclined towards each other and connected to each other at a junction away from the third open side, and the stylus engaging groove is defined by an inner surface of the junction.

15. The protective case for folding screen phone according to claim 14, wherein the rotatable stylus engaging holder further comprises a first end wall connected to adjacent first ends of the first sidewall and the second sidewall, and the first end wall closes a first axial end of the stylus engaging groove, and wherein when the rotatable stylus engaging holder rotates to the first position, the first end wall is distant from the first case body; when the rotatable stylus engaging holder rotates to the second position, one side of the first end wall is attached to the first case body.

16. The protective case for folding screen phone according to claim 15, wherein the rotatable stylus engaging holder further comprises a second end wall opposite to the first end wall, the second end wall is connected to adjacent second ends of the first sidewall and the second sidewall, and the second end wall closes a second axial end of the stylus engaging groove, and wherein when the rotatable stylus engaging holder rotates to the first position, the second end wall is distant from the first case body; when the rotatable stylus engaging holder rotates to the second position, one side of the second end wall is attached to the first case body.

17. The protective case for folding screen phone according to claim 14, wherein the inner surface of the junction which defines the stylus engaging groove is a concave arc surface, wherein, the concave arc surface faces outside when the protective case is in the first state; and the concave arc surface is aligned with the first open side and the second open side when the protective case is in the second state.

18. The protective case for folding screen phone according to claim 14, wherein the rotatable stylus engaging holder comprises a first elastic locking protrusion formed on an inner surface of the first sidewall between the junction and the first edge, and a second elastic locking protrusion formed on an inner surface of the second sidewall between the junction and the first edge;

wherein the first elastic locking protrusion and the second locking protrusion are located at opposite sides of the stylus engaging groove; and wherein when the rotatable stylus engaging holder rotates, the first and second elastic locking protrusions move relative to the first and second case body but are always spaced from a region enclosed by the first and second case body.

19. The protective case for folding screen phone according to claim 14, wherein a cross-section of the rotatable stylus engaging holder has a substantially V-shaped outer profile.

\* \* \* \* \*